(12) United States Patent
Yokose et al.

(10) Patent No.: US 6,782,133 B2
(45) Date of Patent: Aug. 24, 2004

(54) IMAGE ENCODING APPARATUS AND IMAGE DECODING APPARATUS

(75) Inventors: Taro Yokose, Ashigarakami-gun (JP); Ikken So, Ashigarakami-gun (JP); Shunichi Kimura, Ashigarakami-gun (JP); Yutaka Koshi, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/042,338

(22) Filed: Jan. 11, 2002

(65) Prior Publication Data

US 2002/0085769 A1 Jul. 4, 2002

Related U.S. Application Data

(63) Continuation-in-part of application No. 08/956,079, filed on Oct. 22, 1997.

(30) Foreign Application Priority Data

Oct. 25, 1996 (JP) .............................................. 8-283581

(51) Int. Cl.[7] .............................................. G06K 9/36
(52) U.S. Cl. .................... 382/232; 382/248; 382/238
(58) Field of Search ................................ 382/232–233, 382/238, 239, 244, 248, 250, 251, 276, 236, 299–300, 260, 261, 263–266; 348/409.1; 358/525, 426.01–426.09, 447, 445, 426.1, 426.16; 375/240.11, 240.12, 240.2, 240.21–240.25, 240.26

(56) References Cited

U.S. PATENT DOCUMENTS

| 5,128,756 | A | | 7/1992 | Johnston et al. ........ 375/240.12 |
| 5,168,375 | A | | 12/1992 | Reisch et al. ............... 382/250 |
| 5,262,854 | A | | 11/1993 | Ng ......................... 375/240.24 |
| 5,430,556 | A | | 7/1995 | Ito ............................... 382/251 |
| 5,459,514 | A | | 10/1995 | Sakamoto et al. ...... 375/240.11 |
| H1684 | H | | 10/1997 | de Queiroz et al. ......... 382/233 |
| 5,699,457 | A | | 12/1997 | Adar et al. .................. 382/239 |
| 5,740,284 | A | | 4/1998 | Wober et al. ................ 382/250 |
| 5,764,805 | A | | 6/1998 | Martucci et al. ............ 382/236 |
| 5,774,597 | A | * | 6/1998 | Wilson ........................ 382/250 |
| 5,845,015 | A | | 12/1998 | Martucci ..................... 382/250 |
| 5,870,147 | A | | 2/1999 | Sugiyama ................. 348/409.1 |
| 5,917,954 | A | * | 6/1999 | Girod et al. ................. 382/248 |
| 6,473,533 | B1 | * | 10/2002 | Yokose et al. .............. 382/248 |

FOREIGN PATENT DOCUMENTS

JP  A-6-113145  4/1994  .......... H04N/1/413

OTHER PUBLICATIONS

"International Standard Encoding Method for Color Still Image: JPEG Algorithm", Endoh, Interface, 1991. 12pp. 160–182.

Matsumoto et al., English Translation of Consideration of Bitrate Conversion, 1994, ITE Annual Convention, pp. 1–4.

* cited by examiner

*Primary Examiner*—Leo Boudreau
*Assistant Examiner*—Sherali Ishrat
(74) *Attorney, Agent, or Firm*—Oliff & Berridge, PLC

(57) ABSTRACT

An input image is subjected to transform by a DCT transforming unit 20. A coefficient analyzing unit 30 compares a predetermined coefficient and coefficient data 120, and obtains low-frequency image data 150 of the input image by a high-frequency coefficient masking unit 50 and an inverse DCT unit 60 on the basis of a result of that comparison. A pixel subsampling unit 70 receives this low-frequency image data 150, and generates a subsampled image on the basis of the aforementioned result of comparison. The subsampled image and coefficient information are transmitted to a decoding side. A decoding apparatus decodes an image on the basis of the subsampled image and the coefficient information.

3 Claims, 25 Drawing Sheets

ENCODING SIDE

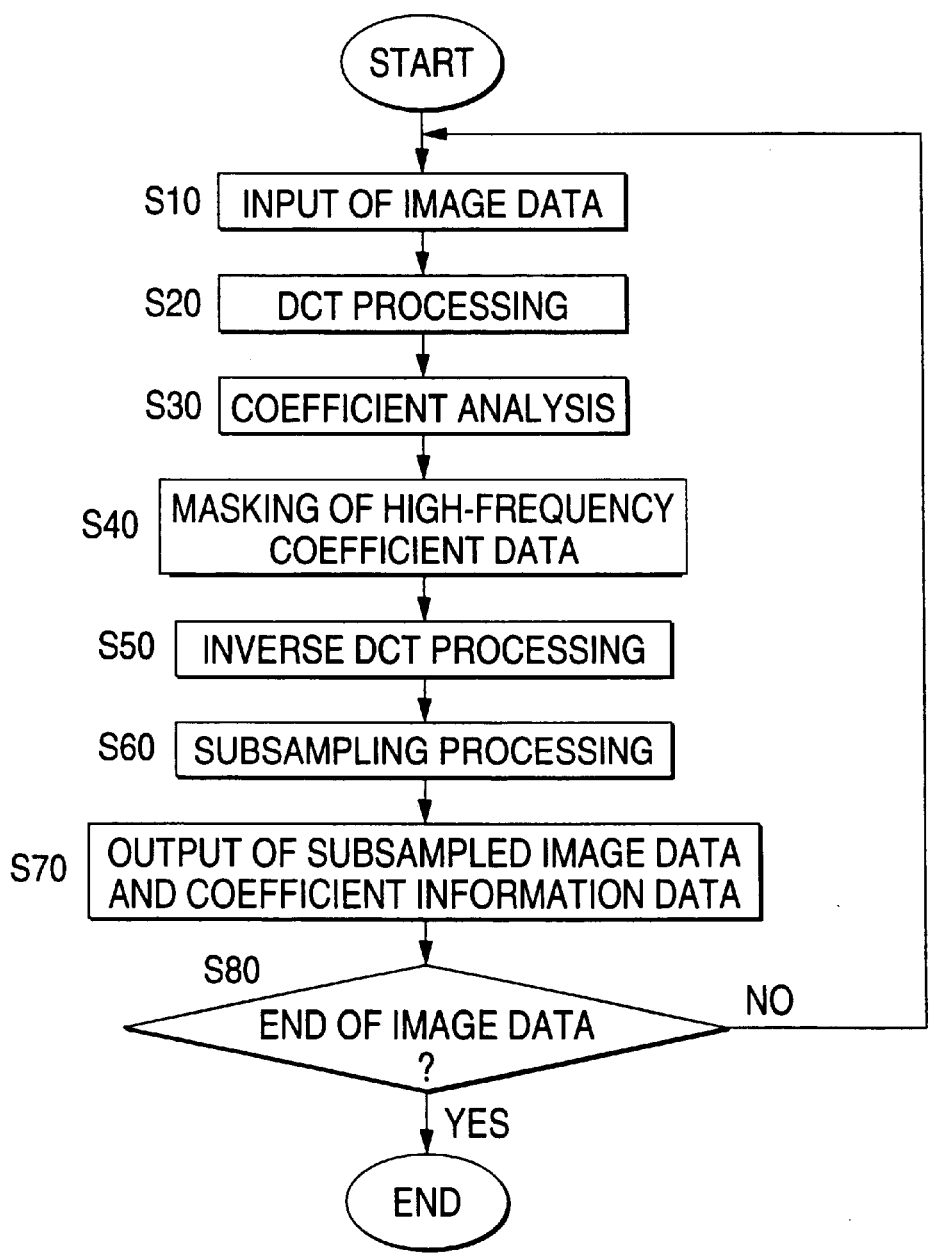

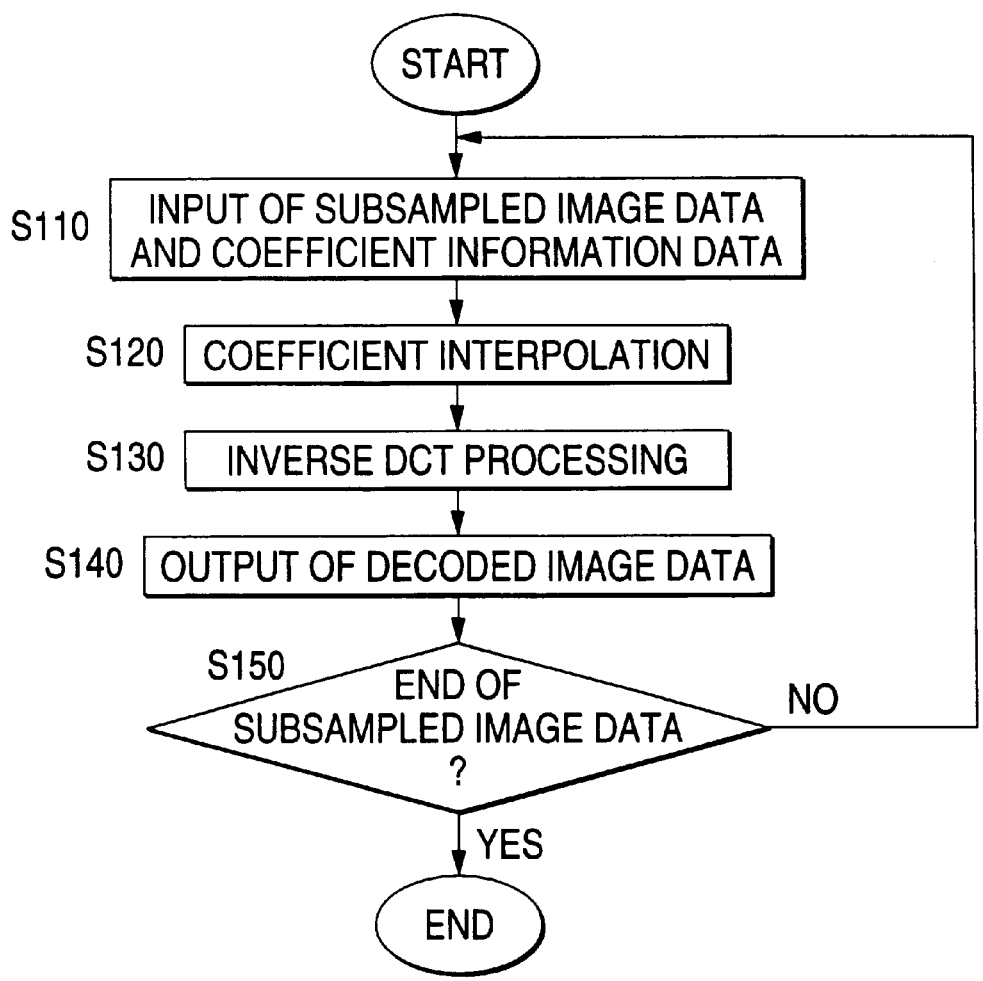

FIG. 5A

IN THE CASE OF $f_u = 2$, $f_v = 3$

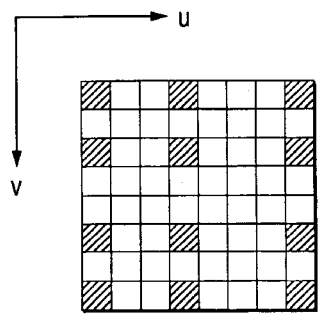

EXAMPLE 1 SATISFYING
RESTRICTIONS

FIG. 5B

▨ PIXEL TO BE LEFT
☐ PIXEL TO BE THINNED OUT

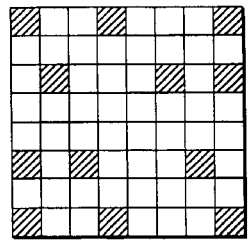

EXAMPLE 2 SATISFYING
RESTRICTIONS

FIG. 5C

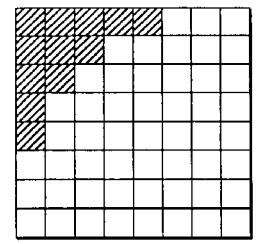

EXAMPLE 1 NOT SATISFYING
RESTRICTIONS

FIG. 5D

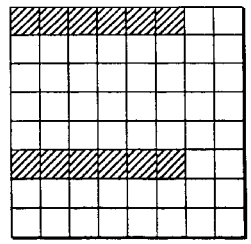

EXAMPLE 2 NOT SATISFYING
RESTRICTIONS $$\begin{bmatrix} -9 & -11 & -1 & 2 & 0 & 0 & 0 & 0 \\ -4 & 1 & 4 & 1 & 0 & 0 & 0 & 0 \\ 0 & 1 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

QUANTIZED COEFFICIENT DATA $$\begin{bmatrix} 1 & 1 & 1 & 1 & 0 & 0 & 0 & 0 \\ 1 & 1 & 1 & 1 & 0 & 0 & 0 & 0 \\ 0 & 1 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

ANALYZED COEFFICIENT DATA 1

FIG. 6A $$\begin{bmatrix} -578.1 & -86.4 & -34.9 & -12.2 & 5.6 & 6.8 & 1.1 & 0.2 \\ -106.5 & -136.7 & -7.7 & 36.7 & -0.8 & -1.1 & 0.8 & 0.7 \\ -49.4 & 16.7 & 58.7 & 19.2 & -5.7 & -2.8 & 2.5 & -0.8 \\ 5.8 & 14.4 & 10.9 & -5.4 & -8.9 & -5.8 & 0.9 & -0.8 \\ -3.1 & 0.2 & 3.1 & -3.4 & -8.9 & -3.0 & 2.6 & 5.5 \\ -1.3 & 2.9 & 2.5 & -3.0 & -2.8 & 1.6 & 3.3 & 1.9 \\ -2.1 & -0.1 & -2.3 & -1.4 & -0.5 & 0.3 & 3.8 & 1.5 \\ 0.0 & -1.1 & 0.2 & 0.6 & -0.8 & -0.9 & 0.4 & 3.0 \end{bmatrix}$$

COEFFICIENT DATA

FIG. 6B $$\begin{bmatrix} -36 & -8 & -3 & -1 & 0 & 0 & 0 & 0 \\ -9 & -11 & -1 & 2 & 0 & 0 & 0 & 0 \\ -4 & 1 & 4 & 1 & 0 & 0 & 0 & 0 \\ 0 & 1 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

QUANTIZED COEFFICIENT DATA

FIG. 6C $$\begin{bmatrix} 1 & 1 & 1 & 1 & 0 & 0 & 0 & 0 \\ 1 & 1 & 1 & 1 & 0 & 0 & 0 & 0 \\ 1 & 1 & 1 & 1 & 0 & 0 & 0 & 0 \\ 0 & 1 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

ANALYZED COEFFICIENT DATA 1

FIG. 6D $$\begin{bmatrix} 1 & 1 & 1 & 1 & 0 & 0 & 0 & 0 \\ 1 & 1 & 1 & 1 & 0 & 0 & 0 & 0 \\ 1 & 1 & 1 & 1 & 0 & 0 & 0 & 0 \\ 1 & 1 & 1 & 1 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

ANALYZED COEFFICIENT DATA 2

FIG. 6E $$\begin{bmatrix} -578.1 & -86.4 & -34.9 & -12.2 & 0 & 0 & 0 & 0 \\ -106.5 & -136.7 & -7.7 & 36.7 & 0 & 0 & 0 & 0 \\ -49.4 & 16.7 & 58.7 & 19.2 & 0 & 0 & 0 & 0 \\ 5.8 & 14.4 & 10.9 & -5.4 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

LOW-FREQUENCY COEFFICIENT DATA

FIG. 7
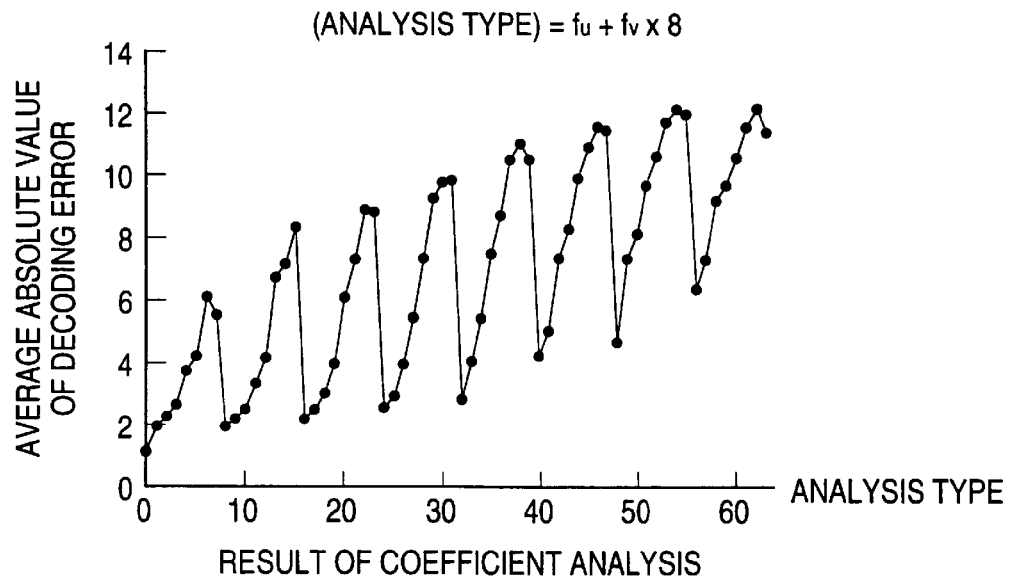
(ANALYSIS TYPE) = fu + fv × 8
RESULT OF COEFFICIENT ANALYSIS
FIG. 8
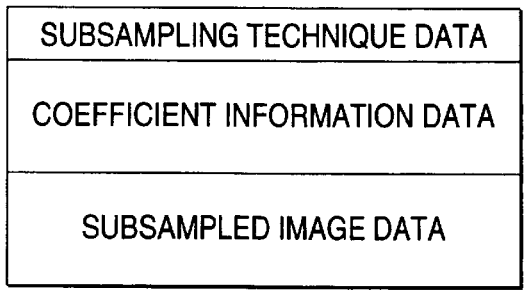
EXAMPLE OF DATA FORMAT
FIG. 9
| COEFFICIENT INFORMATION DATA | PIXEL TO BE LEFT |
|---|---|
| (0, 0) | (3, 3) |
| (0, 1) | (3, 2), (3, 5) |
| ⋮ | ⋮ |
EXAMPLE OF SUBSAMPLING TECHNIQUE DATA

DECODER HIGHLY RESISTIVE AGAINST ALIASING IN ENCODING

ENCODING APPARATUS FOR QUANTIZING PIXEL VALUES

ENCODING APPARATUS FOR DYNAMICALLY CHANGING THRESHOLDS

DECODING APPARATUS FOR DIRECTLY INTERPOLATING PIXEL VALUES

ENCODING APPARATUS FOR DIRECTLY SUBSAMPLING AN INPUT IMAGE

ENCODING APPARATUS TO WHICH CODES
OF JPEG-DCT METHOD ARE INPUTTED

ENCODING APPARATUS FOR COMPOSING COEFFICIENT INFORMATION
AND SUBSAMPLED IMAGE AND OUTPUTTING THE SAME

EXAMPLE 1 OF COMPOSITE DATA

EXAMPLE 2 OF COMPOSITE DATA

ENCODING APPARATUS FOR WHICH COEFFICIENT INFORMATION
IS DESIGNATED FROM OUTER CIRCUIT

DECODING SIDE

INPUT IMAGE

EXAMPLE OF DECODED IMAGE ON THE BASIS OF
1ST CONVENTIONAL EXAMPLE

EXAMPLE OF DECODED IMAGE ON THE BASIS OF
1ST EMBODIMENT

EXAMPLE OF DIFFERENTIAL IMAGE BETWEEN INPUT IMAGE AND
DECODED IMAGE ON THE BASIS OF 1ST CONVENTIONAL EXAMPLE

EXAMPLE OF DIFFERENTIAL IMAGE BETWEEN INPUT IMAGE AND
DECODED IMAGE ON THE BASIS OF 1ST EMBODIMENT

EXPLANATORY DIAGRAM OF AREAS

COMPARISON OF DISTRIBUTION OF PREVIOUS VALUE DIFFERENTIALS IN NATURAL IMAGES AND ARTIFICIAL IMAGES

ENCODING APPARATUS

DECODING APPARATUS

1ST CONVENTIONAL EXAMPLE / ENCODING PROCEDURE

1ST CONVENTIONAL EXAMPLE / DECODING PROCEDURE

FIG. 33A
$$\begin{bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix}$$
FOR LUMINANCE COMPONENTS
FIG. 33B
$$\begin{bmatrix} 17 & 18 & 24 & 47 & 99 & 99 & 99 & 99 \\ 18 & 21 & 26 & 66 & 99 & 99 & 99 & 99 \\ 24 & 26 & 56 & 99 & 99 & 99 & 99 & 99 \\ 47 & 66 & 99 & 99 & 99 & 99 & 99 & 99 \\ 99 & 99 & 99 & 99 & 99 & 99 & 99 & 99 \\ 99 & 99 & 99 & 99 & 99 & 99 & 99 & 99 \\ 99 & 99 & 99 & 99 & 99 & 99 & 99 & 99 \\ 99 & 99 & 99 & 99 & 99 & 99 & 99 & 99 \end{bmatrix}$$
FOR COLOR DIFFERENCE COMPONENTS
FIG. 34
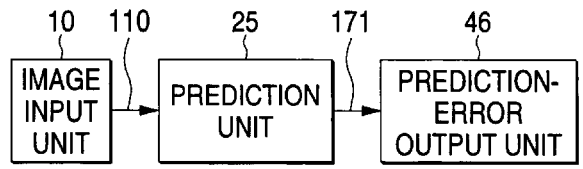
ENCODING APPARATUS
FIG. 35
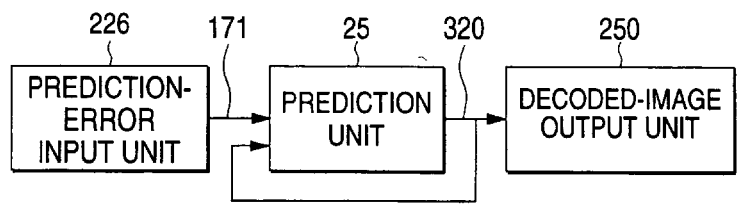
DECODING APPARATUS

2ND CONVENTIONAL EXAMPLE / ENCODING PROCEDURE

2ND CONVENTIONAL EXAMPLE / DECODING PROCEDURE

PREDICTION FORMULAE USED IN JPEG $$\begin{bmatrix} 255 & 255 & 255 & 255 & 0 & 0 & 255 & 255 \\ 255 & 255 & 255 & 255 & 255 & 0 & 255 & 255 \\ 255 & 255 & 255 & 255 & 0 & 255 & 255 & 255 \\ 255 & 255 & 255 & 0 & 0 & 255 & 255 & 255 \\ 255 & 255 & 255 & 0 & 255 & 255 & 255 & 255 \\ 255 & 255 & 0 & 0 & 255 & 255 & 255 & 255 \\ 255 & 255 & 0 & 255 & 255 & 255 & 255 & 255 \\ 255 & 0 & 255 & 255 & 255 & 255 & 255 & 255 \end{bmatrix}$$

INPUT IMAGE METHOD $$\begin{bmatrix} 255 & 251 & 255 & 241 & 0 & 25 & 229 & 255 \\ 255 & 232 & 255 & 255 & 255 & 0 & 255 & 237 \\ 229 & 255 & 253 & 244 & 0 & 255 & 228 & 255 \\ 255 & 227 & 255 & 13 & 0 & 254 & 255 & 255 \\ 255 & 231 & 212 & 41 & 255 & 255 & 247 & 246 \\ 254 & 255 & 10 & 0 & 242 & 246 & 234 & 255 \\ 228 & 255 & 0 & 252 & 255 & 255 & 254 & 255 \\ 255 & 0 & 255 & 255 & 211 & 255 & 234 & 250 \end{bmatrix}$$

DECODED IMAGE
USING JPEG-DCT METHOD

IMAGE ENCODING APPARATUS AND IMAGE DECODING APPARATUS

This is a Division of application Ser. No. 08/956,079 filed Oct. 22, 1997. The entire disclosure of the prior application(s) is hereby incorporated by reference herein in its entirety.

BACKGROUND OF THE INVENTION

1. Field of the Invention

The present invention relates to an image encoding/decoding apparatus, and more particularly to lossy coding with respect to multi-level input images.

2. Description of the Related Art

Since images generally comprise very large volumes of data, the images are generally compressed by encoding during storage and transmission. If the image data subject to image encoding at that time is largely classified into two types, the image data can be classified into, for example, natural images and artificial images.

The former type is one in which actually existing images have been converted into digital data by some means. For instance, an image which is obtained by reading a photograph by a scanner or by capturing a scene by a digital camera corresponds to this type. The latter type is one in which images which do not actually exist are generated as digital data by some means. For instance, computer graphics and a document which is prepared by a word processor correspond to this type. Hereafter, natural images and artificial images are used under these definitions.

Generally, as for natural images, noise tends to be superposed thereon during digital transform, and their high-frequency components tend to degrade. As a result, the resultant data has a large amount of information in low-order bits, and the number of colors used is also large. In addition, if natural images are subjected to frequency analysis, components are liable to concentrate on a low-frequency region, and a high-frequency region attenuates.

On the other hand, in the case of artificial images, the amount of information in low-order bits is not large excluding a case in which noise is intentionally added thereto, and colors which are used are also liable to concentrate on particular colors. In addition, since edges, fine lines, and the like are depicted sharply, a large amount of important information is included in a high-frequency region as well.

Two experimental examples for confirming the above fact are shown in FIGS. 26 to 18. As a first experiment, values in which the square roots of mean squares of coefficients obtained by discrete cosine transform (DCT) processing were individually determined were examined with respect to a number of images. The results in which the square roots were added for the respective eight areas shown in FIG. 26 are shown in the part b) of the same drawing. Since the DCT coefficients are expressed in such a manner that the frequency increases from upper left toward lower right, in FIG. 26 the right-hand side of the x-axis corresponds to a high frequency. As is apparent from the drawing, in the case of natural images, components decrease as the frequency becomes higher, whereas, in the case of artificial images, components are distributed in spite of the frequency.

In a second experiment, adjacent pixel values were fetched from an image, and the statistics of the result of subtraction of a left-hand pixel value from a right-hand pixel value was gathered. Hereinafter, this value is referred to as "a previous value differential". FIG. 28 shows the results of the second experiment. As is apparent from the drawing, in artificial images, the previous value differential is concentrated in 0 in comparison with natural images. This shows that the prediction accuracy in the prediction of the previous value for predicting the right-hand pixel value from the left-hand pixel value becomes high.

Hereafter, image encoding techniques which are effective for natural images and artificial images will be respectively described as first and second conventional examples.

First, a description will be given of a conventional encoding technique with respect to natural images as a first conventional example. Since a natural image inherently contains a large amount of information, it becomes necessary to quantize the information by some technique. Therefore, if consideration is given to the efficiency of quantization, since, in the case of a natural image, frequency components are concentrated in a low-frequency region, quantization in which average errors are made small can be realized by quantizing a low-frequency region finely and quantizing a high-frequency region coarsely. That is, it is possible to minimize the effect on image quality and reduce the amount of information efficiently.

Frequency transform coding, which is one technique of image encoding, makes use of this characteristic, effects frequency transform of an input image, and coarsely quantizes information in high-frequency, in particular. As a typical example of frequency transform coding, it is possible to cite the DCT method of Joint Photographic Experts Group (JPEG), which is an international standard. Hereafter, a description will be given of the JPEG-DCT method as a first conventional example.

Before describing the first conventional example, a description will be given of DCT. The DCT which is used in image encoding is called two-dimensional DCT, to be accurate, and is obtained by independently processing two one-dimensional DCT in the horizontal direction and the vertical direction. According to "kara seishi gazo no kokusai fugouka houshiki —JPEG arugorizumu—(International standard encoding method for color still image: JPEG Algorithm)" (Endoh, *Interface*, 1991. 12, pp. 160–182), if an image block subject to transformation is written as x(m, n) and a transformed coefficient block as y(u, v), an 8×8 DCT transformation formula and an inverse transformation formula for an 8-bit image can be written as follows.

[Mathematical Formula 1]

$$y(u,v) = \frac{c(u)c(v)}{4} \sum_{m=0}^{7} \sum_{n=0}^{7} (x(m,n)-128)\cos\frac{(2m+1)u\pi}{16}\cos\frac{(2n+1)v\pi}{16} \quad (1)$$

$$x(m,n) = \frac{1}{4} \sum_{u=0}^{7} \sum_{v=0}^{7} c(u)c(v)y(u,v)\cos\frac{(2m+1)u\pi}{16}\cos\frac{(2n+1)v\pi}{16} + 128 \quad (2)$$

where $$c(u), c(v) = \frac{1}{\sqrt{2}} \quad (u, v = 0)$$
$$= 1 \text{ and others}$$

FIGS. 29 and 30 are an image lossy encoding apparatus and an image lossy decoding apparatus, respectively, in accordance with the first conventional example. These drawings are partially taken from FIG. 3 on page 163 of "kara seishi gazo no kokusai fugouka houshiki —JPEG arugorizunu—(International standard encoding method for color still image: JPEG Algorithm)" (ibid.), and terms are modified. In FIGS. 29 and 30, reference numeral 10 denotes an image input unit; 20, a DCT unit; 35, a coefficient quantizing unit; 45, coefficient output unit; 110, input image data; 120, coefficient data; 170, quantized coefficient data; 225, a coefficient input unit; 240, an inverse DCT unit; 250, a decoded-image output unit; 260, a coefficient inversely-quantizing unit; 320, decoded image data; and 330, inversely-quantized coefficient data.

A description will be given of the various units shown in FIGS. 29 and 30. The encoding apparatus in FIG. 29 has the following configuration. The image input unit 10 receives as its input an image from an external circuit, and sends the same to the DCT unit 20 as the input image data 110. The DCT unit 20 effects DCT processing with respect to the input image data 110, and sends the result to the coefficient quantizing unit 30 as the coefficient data 120. The coefficient quantizing unit 30 effects quantization processing with respect to the coefficient data 120 in a predetermined method, and sends the result to a coefficient output unit 90 as the quantized coefficient data 170. The coefficient output unit 90 outputs the quantized coefficient data 170 to an external circuit.

Next, the decoding apparatus in FIG. 30 has the following configuration. The coefficient input unit 220 receives coefficients as its input, and sends the same to the coefficient inversely-quantizing unit 260 as the quantized coefficient data 170. With respect to the quantized coefficient data 170, the coefficient inversely-quantizing unit 260 effects inverse quantization, i.e., an inverse transformation of the quantization effected by the coefficient quantizing unit 30, and sends the result to the inverse DCT unit 240 as the inversely-quantized coefficient data 330. With respect to the inversely-quantized coefficient data 330, the inverse DCT unit 240 effects inverse DCT processing, i.e., an inverse transformation of the DCT processing effected by the DCT unit 20, and sends the result to the decoded-image output unit 250 as the decoded image data 320. The decoded-image output unit 250 outputs the decoded image data 320 to an external circuit.

The above-described configuration is a part of the first conventional example, and a general configuration is arranged such that the quantized coefficient data 170 is generally subjected to variable-length coding, such as Huffman coding and QM coding, by the encoding apparatus, while a decoding corresponding to the variable-length coding is effected by the decoding apparatus, thereby obtaining the quantized coefficient data 170. Since these portions are irrelevant to the essence of the present invention, and the omission of these portions does not impair the essence of the first conventional example, a description thereof will be omitted here.

On the basis of the above-described configuration, a description will be given of the operation of the first conventional example. FIGS. 31 and 32 are flowcharts illustrating the operation of the conventional example.

First, referring to FIG. 31, a description will be given of the encoding procedure in accordance with the first conventional example. In S10, an image is inputted to the image input unit 10 from an external circuit, and the input image data 110 is obtained. In S20, the DCT unit 20 effects DCT processing to obtain the coefficient data 120. In S35, the coefficient quantizing unit 30 effects quantization processing with respect to the coefficient data 120 in a predetermined method, thereby obtaining the quantized coefficient data 170. In S75, the coefficient output unit 90 outputs the quantized coefficient data 170 to an external circuit. In S80, a determination is made as to whether or not all the processing of the input image data 110 inputted has been completed, and if not completed, the operation returns to S10, and if completed, the encoding procedure ends.

Next, referring to FIG. 32, a description will be given of the decoding procedure in accordance with the first conventional example. In S115, coefficients are inputted to the coefficient input unit 220 from an external circuit, and the quantized coefficient data 170 is obtained. In S125, the coefficient inversely-quantizing unit 260 effects inverse quantization processing to obtain the inversely-quantized coefficient data 330. In S130, the inverse DCT unit 240 effects inverse DCT processing with respect to the inversely-quantized coefficient data, thereby obtaining the decoded image data 320. In S140, the decoded-image output unit 250 outputs the decoded image data 320 to an external circuit. In S150, a determination is made as to whether or not all the processing of the quantized coefficient data 170 inputted has been completed, and if not completed, the operation returns to S115, and if completed, the decoding procedure ends.

A description will be given of the quantization processing which is effected by the coefficient quantizing unit 35 in the above-described operation. As described above, in a general frequency transform coding scheme, high-frequency components are coarsely quantized as compared with low-frequency components. In the JPEG-DCT method, a linear quantization of the formula shown below is used. Here, round is a function which returns an integer which is closest to an argument.

[Mathematical Formula 2]

$$\text{(Quantization coefficient)} = \text{round}\left((\text{DCT coefficient}) / (\text{quantization step})\right) \qquad (3)$$

FIGS. 33A and 33B show a recommended quantization table of the JPEG-DCT method (source: ibid., FIG. 9 on page 167 of "kara seishi gazo no kokusai fugouka houshiki —JPEG arugorizumu—(International standard encoding method for color still image: JPEG Algorithm)"). In the drawing, numerals represent quantization steps, and the greater the numeral value, the more coarsely quantization is effected. In the same way as the DCT coefficients in Formula (1), the quantization table is written in such a manner that the frequency becomes higher from upper left toward lower right; hence, it follows that high-frequency components, in particular, are quantized coarsely.

Next, a conventional encoding technique concerning artificial images will be described as a second conventional example. In artificial images, since the same colors often locally appear in a space as shown in FIG. 28, predictive coding in which prediction of pixel values on the basis of neighboring pixels and encoding of prediction errors are combined is effective. Hereafter, as a typical example of predictive coding, the spatial method, which is a lossless coding method set forth in the aforementioned international JPEG, will be described as the second conventional example.

Before specifically describing the second conventional example, a description will be given of predictive coding. Predictive coding is a technique in which a pixel value of a pixel subjected to coding next is estimated, and a prediction error obtained by the following formula is encoded.

[Mathematical Formula 3]

$$\text{(Prediction error)} = \text{(actual pixel value)} - \text{(predicted value)} \quad (4)$$

In artificial images, since prediction errors are concentrated in 0 as shown in FIG. 27, the amount of codes can be reduced as compared with natural images. In addition, particularly in lossless predictive coding, amount-of-coding control cannot be effected; however, there is no possibility of the degradation of image quality.

Hereafter, a specific description will be given of the second conventional example. FIGS. 34 and 35 are an image lossy encoding apparatus and an image lossy decoding apparatus, respectively, in accordance with the second conventional example. These drawings are partially taken from ibid., FIG. 17 on page 173 of "kara seishi gazo no kokusai fugouka houshiki —JPEG arugorizumu—(International standard encoding method for color still image: JPEG Algorithm)", a decoding apparatus is added, and terms are modified. In the drawings, those portions which are similar to those of FIGS. 29 and 30 will be denoted by the same reference numerals, and a description thereof will be omitted. Reference numeral 25 denotes a predicting unit; 46, a prediction-error output unit; 226, a prediction-error input unit; and 171, prediction error data.

A description will be given of the various units shown in FIGS. 34 and 35. The encoding apparatus in FIG. 34 has the following configuration. The predicting unit 25 predicts a pixel value to be encoded next by using the input image data 110, and sends a difference with an actual pixel value to the prediction-error output unit 46 as the prediction error data 171.

The decoding apparatus in FIG. 35 has the following configuration. The prediction-error input unit 226 receives prediction errors as its input, and sends the same to the predicting unit 25 as the prediction error data 171. Although the predicting unit 25 is identical to the predicting unit 25 of the encoding apparatus, but differs from the same in that reference is made to a decoded image for predicting a next pixel.

On the basis of the above-described configuration, a description will be given of the operation in accordance with the second conventional example. FIGS. 36 and 37 are flowcharts illustrating the operation of the conventional example.

First, referring to FIG. 36, a description will be given of the encoding procedure in accordance with the first conventional example. Those portions which are similar to those of FIG. 31 are denoted by the same reference numerals, and a description thereof will be omitted. In S25, the predicting unit 25 computes a prediction error in accordance with Formula (4). In S76, the prediction-error output unit 46 outputs to an external circuit the prediction error data 171 computed in S25.

Next, referring to FIG. 37, a description will be given of the decoding procedure in accordance with the first conventional example. Those portions which are similar to those of FIG. 32 are denoted by the same reference numerals, and a description thereof will be omitted. In S116, the prediction-error input unit 226 receives as its input the prediction error from an external circuit. In S135, the predicting unit 25 computes a pixel value by the addition of the predicted value and the prediction error.

A description will be given of the prediction error computation processing in the description of the operation. In the JPEG-Spatial method, it is decided that one of the seven predictors shown in FIG. 38 be used. For example, in a case where a is selected as a prediction formula, it suffices if the value of a pixel which is a left-side neighbor to a pixel x to be encoded from now on is set as a predicted value.

Although the first and second conventional examples have been described above, it is shown below that it is difficult to effect encoding efficiently by either one of the first and second conventional examples irrespective of the distinction between natural images and artificial images.

Since, in an artificial image, important information is included in high-frequency components as well, if quantization is effected as shown in FIGS. 33A and 33B in which a high-frequency region is coarsely quantized, the degradation of the image quality, e.g., mosquito noise, occurs. An example of mosquito noise which occurred due to the quantization table shown in FIG. 33A is shown in FIGS. 39A and 39B. FIG. 39A shows an input image, while FIG. 39B shows a decoded image. In a frequency transform coding scheme such as JPEG-DCT, such noise makes it difficult to reduce the amount of codes while maintaining the image quality with respect to an artificial image. This state is shown in FIG. 40.

On the other hand, in the case of a natural image, pixel values differ even among neighboring pixels due to the effect of noise, so that the amount of codes does not diminish in the lossless predictive coding such as JPEG-Spatial method. This state is shown in FIG. 41. In addition, in the lossless coding, the image quality and the amount of codes cannot be traded off, so that amount-of-coding control cannot be effected. Since this drawback directly affects the capacity of a storage medium, a communication band, and the like, the structuring of the system is made difficult.

Thus, in the first and second conventional examples, images which cannot be encoded effectively are present. To overcome this problem, a technique in which lossy encoding and lossless encoding are selectively used for respective portions is conceivable. As such an example, Japanese Patent Application Laid-Open No. 113145/1994 is known. Hereafter, the invention disclosed in that publication will be described as a third conventional example.

FIG. 42 is a schematic diagram of an image processing apparatus in accordance with the third conventional example. In this drawing, a portion of FIG. 1 in that publication is omitted in such a way as not to impair the purport of Japanese Patent Application Laid-Open No. 113145/1994, and terms are modified. In the drawing, reference numeral 15 denotes an artificial-image input unit; 16, a natural-image input unit; 90, an artificial-image encoding unit; 91, a natural-image encoding unit; 92, an artificial-image storage unit; 93, a natural-image storage unit; 94, an artificial-image decoding unit; 95, a natural-image decoding unit; 96, an image composing unit; 112, input artificial-image data; 113, input natural-image data; 114, encoded artificial-image data; 115, encoded natural-image data; 116, decoded artificial-image data; and 117, decoded natural-image data.

A description will be given of the various units shown in FIG. 42 the artificial-image input unit 15 and the natural-image input unit 16 respectively receive as their inputs an artificial image and a natural image from external circuits, and send them to the artificial-image encoding unit 90 and the natural-image encoding unit 91 as the input artificial-image data and the input natural-image data 113, respectively. The artificial-image encoding unit 90 and the natural-image encoding unit 91 effect encoding with respect to the input artificial-image data and the input natural-image data 113 by predetermined techniques, respectively, and send the results to the artificial-image storage unit 92 and the natural-image storage unit 93 as the encoded artificial-image data 114 and the encoded natural-image data 115, respectively. The artificial-image storage unit 92 and the natural-image storage unit 93 temporarily store the encoded artificial-image data 114 and the encoded natural-image data 115, respectively, and send them to the artificial-image decoding unit 94 and the natural-image decoding unit 95, respectively. With respect to the encoded artificial-image data 114 and the encoded natural-image data 115, the artificial-image decoding unit 94 and the natural-image decoding unit 95 respectively effect decoding processings corresponding to the encoding effected by the artificial-image encoding unit 90 and the natural-image encoding unit 91, and send the results to the image composing unit 96 as the decoded artificial-image data 116 and the decoded natural-image data 117, respectively. The image composing unit 96 combines the decoded artificial-image data 116 and the decoded natural-image data 117.

In the above description, it is stated in the first embodiment of the aforementioned patent that the encoding which is effected by the artificial-image encoding unit 90 "has the function of a lossless method such as the run-length coding method." In addition, it is also stated in the first embodiment of that patent that the encoding which is effected by the natural-image encoding unit 91 is "an image compression system such as JPEG." It should be noted that JPEG referred to in that patent refers to the JPEG-DCT method referred to in this description.

It has already been pointed out that since the first and second conventional examples are designed specifically for natural images and artificial images, respectively, it is difficult to handle both types of images efficiently by either one of the independent techniques.

In the third conventional example, since a natural image and an artificial image are encoded and decoded in parallel by totally different methods, the processing times in both processings generally do not coincide. For this reason, it is impossible to produce an output to an external circuit until all the encoded data are gathered during encoding, and until all the image data are gathered during decoding. Hence, at least one image portion of a code buffer is required for the encoding apparatus, while at least one image portion of an image buffer is similarly required for the decoding apparatus. These are unnecessary configurations in the case of an image encoding/decoding apparatus having a method of only one system.

In addition, since both the encoding apparatus and the decoding apparatus have two systems or more, an increase in the scale of the apparatus results. Further, since the image is expressed by a plurality of totally different codes, the handling of codes becomes complex during such as transmission or storage. Still further, with respect to the image quality of a decoded image as well, noise can possibly occur in a portion where the encoding method is changed over.

SUMMARY OF THE INVENTION

The present invention has been devised in view of the above-described circumstances, and its object is to provide a single encoding apparatus and a decoding apparatus capable of effective compression irrespective of the distinction between a natural image and an artificial image.

To attain the above object, the present invention adopts the following configurations. First, a description will be given of the invention of the image encoding apparatus.

In accordance with the invention, there is provided an image encoding apparatus comprising: image input means for inputting an image; frequency transforming means for effecting frequency transform for determining frequency components of the image inputted by said image input means; threshold processing means for effecting threshold processing of the frequency components determined by said frequency transforming means; low-frequency image output means for outputting an image of low-frequency components of the image inputted by said image input means, in correspondence with a result of threshold processing by said threshold processing means; pixel subsampling means for effecting predetermined subsampling processing with respect to the image outputted by said low-frequency image output means, in correspondence with the result of threshold processing by said threshold processing means; coefficient-information output means for outputting the result of threshold processing by said threshold processing means; and subsampled-image output means for outputting the image subjected to subsampling processing by said pixel subsampling means.

In this configuration, by representing an image with an optimum resolution, it is possible to suppress redundant components and reduce the amount of codes. To determine the optimum resolution, frequency analysis is performed, and the subsampling processing of pixels is effected on the basis of the result of this analysis.

In accordance with the invention, there is provided an image encoding apparatus comprising: image input means for inputting an image; frequency transforming means for effecting frequency transform for determining frequency components of the image inputted by said image input means; threshold processing means for effecting threshold processing of the frequency components determined by said frequency transforming means; high-frequency coefficient masking means for replacing high-frequency components with 0s of the frequency components determined by said frequency transforming means, in correspondence with a result of threshold processing by said threshold processing means; inversely transforming means for effecting inverse frequency transform in which the frequency components with the high-frequency components replaced into 0s by said high-frequency coefficient masking means are converted into an image; pixel subsampling means for effecting predetermined subsampling processing with respect to the image converted by said inversely transforming means, in correspondence with the result of threshold processing by said threshold processing means; coefficient-information output means for outputting the result of threshold processing by said threshold processing means; and subsampled-image output means for outputting the image subjected to subsampling processing by said pixel subsampling means.

In this configuration as well, by representing an image with an optimum resolution, it is possible to suppress redundant components and reduce the amount of codes.

In accordance with the invention, there is provided an image encoding apparatus comprising: image input means for inputting an image; frequency transforming means for effecting frequency transform for determining frequency components of the image inputted by said image input means; threshold processing means for effecting threshold processing of the frequency components determined by said frequency transforming means; pixel subsampling means for effecting predetermined subsampling processing with respect to the image inputted by said image input means, in correspondence with the result of threshold processing by said threshold processing means; coefficient-information output means for outputting the result of threshold processing by said threshold processing means; and subsampled-image output means for outputting the image subjected to subsampling processing by said pixel subsampling means.

In this configuration as well, by representing an image with an optimum resolution, it is possible to suppress redundant components and reduce the amount of codes.

In accordance with the invention, there is provided an image encoding apparatus comprising: image input means for inputting an image; pseudo-decoded-image generating means for generating a pseudo-decoded image by subjecting the image inputted by said image input means to predetermined subsampling processing and predetermined interpolation processing; coefficient analyzing means for determining a subsampling rate on the basis of an error between the pseudo-decoded image generated by said pseudo-decoded-image generating means and the image inputted by said image input means; pixel subsampling means for effecting predetermined subsampling processing with respect to the image inputted by said image input means, in correspondence with the subsampling rate determined by said coefficient analyzing means; coefficient-information output means for outputting the subsampling rate determined by said coefficient analyzing means; and subsampled-image output means for outputting the image subjected to subsampling processing by said pixel subsampling means.

In this configuration as well, by representing an image with an optimum resolution, it is possible to suppress redundant components and reduce the amount of codes.

Further, in accordance with the invention, in the image encoding apparatus, the error used in said coefficient analyzing means is a maximum value of a pixel value error, an absolute value of the error, and a squared value of the error, or one of a dynamic range, a variance, and an SN ratio.

Further, in accordance with the invention, in the image encoding apparatus, the predetermined interpolation processing by said pseudo-decoded-image generating means is one of nearest-neighbor interpolation, 4-point linear interpolation, 9-point second-order interpolation, cubic convolution interpolation, and low-pass filter processing.

In accordance with the invention, there is provided an image encoding apparatus comprising: code input means for inputting codes obtained by subjecting an image to frequency transform and entropy coding; entropy decoding means for obtaining frequency components by subjecting the codes inputted by said code input means to decoding which is an inverse transformation of entropy coding effected with respect to the codes; threshold processing means for effecting threshold processing with respect to the frequency components obtained by said entropy decoding means; high-frequency coefficient masking means for replacing high-frequency components with 0s of the frequency components obtained by said entropy decoding means, in correspondence with a result of threshold processing by said threshold processing means; inversely transforming means for effecting inverse frequency transform in which the frequency components with the high-frequency components replaced into 0s by said high-frequency coefficient masking means are converted into an image; pixel subsampling means for effecting predetermined subsampling processing with respect to the image converted by said inversely transforming means, in correspondence with the result of threshold processing by said threshold processing means; coefficient-information output means for outputting the result of threshold processing by said threshold processing means; and subsampled-image output means for outputting the image subjected to subsampling processing by said pixel subsampling means.

Further, in accordance with the invention, in the image encoding apparatus, the decoding by said entropy decoding means is one of Huffman coding, arithmetic coding, and QM coding.

In accordance with the invention, there is provided an image encoding apparatus comprising: image input means for inputting an image; frequency transforming means for effecting frequency transform for determining frequency components of the image inputted by said image input means; threshold processing means for effecting threshold processing of the frequency components determined by said frequency transforming means; high-frequency coefficient masking means for replacing high-frequency components with 0s of the frequency components obtained by said frequency transforming means, in correspondence with a result of threshold processing by said threshold processing means; inversely transforming means for effecting inverse frequency transform in which the frequency components with the high-frequency components replaced into 0s by said high-frequency coefficient masking means are converted into an image; pixel subsampling means for effecting predetermined subsampling processing with respect to the image converted by said inversely transforming means, in correspondence with the result of threshold processing by said threshold processing means; data composing means for combining the subsampled image obtained by said pixel subsampling means and the result of threshold processing by said threshold processing means; and composite-data output means for outputting composite data composed by said data composing means.

In this configuration as well, by representing an image with an optimum resolution, it is possible to suppress redundant components and reduce the amount of codes.

In accordance with the invention, there is provided an image encoding apparatus comprising: image input means for inputting an image; coefficient-information input means for inputting coefficient information; frequency transforming means for effecting frequency transform for determining frequency components of the image inputted by said image input means; high-frequency coefficient masking means for replacing high-frequency components with 0s of the frequency components determined by said frequency transforming means, in correspondence with the coefficient information inputted by said coefficient-information input means; inversely transforming means for effecting inverse frequency transform in which the frequency components with the high-frequency components replaced into 0s by said high-frequency coefficient masking means are converted into an image; pixel subsampling means for effecting predetermined subsampling processing with respect to the image converted by said inversely transforming means, in correspondence with the coefficient information inputted by said coefficient-information input means; coefficient-information output means for outputting the coefficient information inputted by said coefficient-information input means; and subsampled-image output means for outputting the image subjected to subsampling processing by said pixel subsampling means.

In this configuration as well, by representing an image with an optimum resolution, it is possible to suppress redundant components and reduce the amount of codes.

Further, in accordance with the invention, the image encoding apparatus further comprises: image encoding means for effecting image encoding with respect to the subsampled image outputted by said subsampled-image output means.

Further, in accordance with the invention, in the image encoding apparatus, the image encoding effected by said image encoding means is one of or both of lossless coding and predicting coding.

Further, in accordance with the invention, the image encoding apparatus further comprises: coefficient-image encoding means for effecting entropy coding with respect to the coefficient image outputted by said coefficient-image output means.

Further, in accordance with the invention, in the image encoding apparatus, the frequency transform effected by said frequency transforming means and said inversely transforming means is one of discrete cosine transform, Fourier transform, discrete sine transform, subband transform, and wavelet transform.

Further, in accordance with the invention, in the image encoding apparatus, the threshold processing by said threshold processing means is threshold processing in which a predetermined quantization table is set as the threshold.

Further, in accordance with the invention, in the image encoding apparatus, the quantization table used by said threshold processing means can be set by an external circuit.

Further, in accordance with the invention, in the image encoding apparatus, said high-frequency coefficient masking means replaces a component greater than a maximum frequency component with a 0 by means of said threshold processing means.

Further, in accordance with the invention, in the image encoding apparatus, the subsampling processing by said pixel subsampling means is effected in proportion to a ratio which is derived from a distribution of maximum frequencies within a block or frequency components which are not 0s.

Further, in accordance with the invention, in the image encoding apparatus, a ratio of subsampling processing effected by said pixel subsampling means is quantization to a predetermined value set in advance.

Further, in accordance with the invention, in the image encoding apparatus, the predetermined subsampling processing by said pixel subsampling means is one of leaving pixels in lattice form, effecting the subsampling processing at identical rates for a vertical direction and a horizontal direction, effecting the subsampling processing such that pixels which remain become substantially equidistanced, and preferentially leaving peak values in neighboring pixels.

Further, in accordance with the invention, in the image encoding apparatus, the subsampling processing by said pixel subsampling means is the thinning out of the same pixels which were previously thinned out in a case where the image inputted by said image input means were already subjected to encoding by said image encoding apparatus.

Further, in accordance with the invention, the image encoding apparatus further comprises: pixel-value quantizing means for quantizing a pixel value of the image subjected to subsampling processing by said pixel subsampling means.

Further, in accordance with the invention, in the image encoding apparatus, said pixel-value quantizing means changes a quantization step in correspondence with a result of threshold processing by said threshold processing means, or changes the quantization step in correspondence with a magnitude of the threshold used by said threshold processing means.

Further, in accordance with the invention, the image encoding apparatus further comprises: image determining means for determining the threshold used by said threshold processing means by performing predetermined analysis with respect to the image inputted by said image input means.

Further, in accordance with the invention, in the image encoding apparatus, said image determining means determines a difference between a natural image and an artificial image, and in the case of the artificial image sets the threshold to a 0 and effects control so as to prevent the occurrence of a frequency component which is set to a 0 in the threshold processing by said threshold processing means.

Further, in accordance with the invention, in the image encoding apparatus, the predetermined analysis processing by said image determining means involves measurement of a dynamic range of the pixel values, measurement of a histogram of the pixel values, measurement of an entropy of lower bits of the pixel values, measurement of the sharpness of an edge, measurement of the size of a line, measurement of a frequency component, designation from an external circuit, and detection of at least one component from among an edge, a pattern, a gradation, and a line.

Next, a description will be given of an image decoding apparatus.

In accordance with the invention, there is provided an image decoding apparatus comprising: coefficient-information input means for inputting coefficient information; subsampled-image input means for inputting a subsampled image; coefficient interpolating means for computing a frequency component by a predetermined technique in correspondence with the subsampled image inputted by said subsampled-image input means and the coefficient information inputted by said coefficient-information input means; inversely transforming means for effecting inverse frequency transform so as to convert the frequency component computed by said coefficient interpolating means into an image; and decoded-image output means for outputting the image converted by said inversely transforming means.

In this configuration, it is possible to decode image data which has been compressed by effecting adaptive subsampling in correspondence with frequency analysis.

In accordance with the invention, there is provided an image decoding apparatus comprising: coefficient-information input means for inputting coefficient information for each block which is a fixed region of an image; subsampled-image input means for inputting a subsampled image for each block; pixel-value interpolating means for interpolating a pixel value by a predetermined technique in correspondence with the subsampled image inputted by said subsampled-image input means and the coefficient information inputted by said coefficient-information input means; and decoded-image output means for outputting the image interpolated by said pixel-value interpolating means.

In this configuration as well, it is possible to decode image data which has been compressed by effecting adaptive subsampling in correspondence with frequency analysis.

Further, in accordance with the invention, in the image decoding apparatus, the predetermined technique used by said pixel-value interpolating means is one of nearest-neighbor interpolation, 4-point linear interpolation, 9-point second-order interpolation, cubic convolution interpolation, and low-pass filter processing.

In accordance with the invention, there is provided an image decoding apparatus comprising: composite-data input means for inputting composite data which is data combining coefficient information and a subsampled image; data decomposing means for decoding the composite data inputted by said composite-data input means into the subsampled image and the coefficient information; coefficient interpolating means for computing a frequency component by a predetermined technique, in correspondence with the subsampled image and the coefficient information which were decomposed by said data decomposing means; inversely transforming means for effecting inverse frequency transform in which the frequency component computed by said coefficient interpolating means is converted into the image; and decoded-image output means for outputting the image converted by said inversely transforming means.

In this configuration as well, it is possible to decode image data which has been compressed by effecting adaptive subsampling in correspondence with frequency analysis.

Further, in accordance with the invention, the image decoding apparatus further comprises: image decoding means for decoding into an image a code subjected to image encoding with respect to the subsampled image, wherein said subsampled-image input means inputs as the subsampled image the image decoded by said image decoding means.

Further, in accordance with the invention, in the image decoding apparatus, the decoding effected by said image decoding means is inverse processing of lossless coding or inverse processing of predictive coding.

Further, in accordance with the invention, the image decoding apparatus further comprises: pixel-value correcting means for replacing a pixel, which is included in the subsampled image inputted by said subsampled-image input means of the image converted by said inversely transforming means, with the pixel value of the subsampled image, wherein said decoded-image output means outputs the image corrected by said pixel-value correcting means.

Further, in accordance with the invention, in the image decoding apparatus, the frequency transform effected by said inversely transforming means and said inversely transforming means is one of discrete cosine transform, Fourier transform, discrete sine transform, subband transform, and wavelet transform.

Further, in accordance with the invention, in the image decoding apparatus, the coefficient interpolation effected by said coefficient interpolating means is one of the solving of a simultaneous system of linear equations concerning frequency coefficients and pixel values, computation of an inverse matrix determined in advance with respect to the simultaneous system of linear equations concerning frequency coefficients and pixel values, and low-pass filtering of the subsampled image or approximate processing.

In accordance with the invention, there is provided an image encoding/decoding apparatus comprising: image input means for inputting an image; frequency transforming means for effecting frequency transform for determining frequency components of the image inputted by said image input means; threshold processing means for effecting threshold processing of the frequency components determined by said frequency transforming means; high-frequency coefficient masking means for replacing high-frequency components with 0s of the frequency components determined by said frequency transforming means, in correspondence with a result of threshold processing by said threshold processing means; first inversely transforming means for effecting inverse frequency transform in which the frequency components with the high-frequency components replaced into 0s by said high-frequency coefficient masking means are converted into an image; pixel subsampling means for effecting predetermined subsampling processing with respect to the image converted by said first inversely transforming means, in correspondence with the result of threshold processing by said threshold processing means; coefficient-information output means for outputting the result of threshold processing by said threshold processing means; subsampled-image output means for outputting the image subjected to subsampling processing by said pixel subsampling means; coefficient-information input means for inputting coefficient information which is a result of threshold processing outputted by said coefficient-information output means; subsampled-image input means for inputting the subsampled image outputted by said subsampled-image output means; coefficient interpolating means for computing a frequency component by a predetermined technique in correspondence with the subsampled image inputted by said subsampled-image input means and the coefficient information inputted by said coefficient-information input means; second inversely transforming means for effecting inverse frequency transform so as to convert the frequency component computed by said coefficient interpolating means into an image; and decoded-image output means for outputting the image converted by said second inversely transforming means.

In this configuration, by representing an image with an optimum resolution, it is possible to suppress redundant components and reduce the amount of codes. To obtain the optimum resolution, frequency analysis is performed, and the subsampling processing of pixels is effected on the basis of the result of this analysis. In addition, it is possible to decode image data which has been compressed by effecting adaptive subsampling in correspondence with the frequency analysis.

In accordance with the invention, there is provided an image encoding method comprising: step 1 for inputting an image; step 2 for effecting frequency transform for determining frequency components of the image inputted in said step 1; step 3 for effecting threshold processing of the frequency components determined in said step 2; step 4 for replacing high-frequency components with 0s of the frequency components determined in said step 2, in correspondence with a result of threshold processing in said step 3; step 5 for effecting inverse frequency transform in which the frequency components with the high-frequency components replaced into 0s in said step 4 are converted into an image; step 6 for effecting predetermined subsampling processing with respect to the image converted in said step 5, in correspondence with the result of threshold processing in said step 3; step 7 for outputting the result of threshold processing in said step 3; and step 8 for outputting the image subjected to subsampling processing in said step 6.

In this configuration, by representing an image with an optimum resolution, it is possible to suppress redundant components and reduce the amount of codes.

In accordance with the invention, there is provided an image decoding method comprising: step 1 for inputting coefficient information; step 2 for inputting a subsampled image; step 3 for computing a frequency component by a predetermined technique in correspondence with the subsampled image inputted in said step 2 and the coefficient information inputted in said step 1; step 4 for effecting inverse frequency transform so as to convert the frequency component computed said step 3; and step 5 for outputting the image converted step 4.

In this configuration as well, it is possible to decode image data which has been compressed by effecting adaptive subsampling in correspondence with the frequency analysis.

The above and other objects and features of the present invention will be more apparent from the following description taken in conjunction with the accompanying drawings.

BRIEF DESCRIPTION OF THE DRAWINGS

FIG. 3 is a flowchart illustrating an example of the operation of encoding processing by the image encoding apparatus in accordance with the first embodiment of the present invention;

FIG. 4 is a flowchart illustrating an example of the operation of decoding processing by the image decoding apparatus in accordance with the first embodiment of the present invention;

FIGS. 5A to 5D are diagrams explaining subsampling processing in the first embodiment of the present invention;

FIGS. 6A to 6E are diagrams explaining coefficient data processing in the first embodiment of the present invention;

FIG. 7 is an explanatory diagram concerning errors of pixel values in a decoded image in accordance with a JPEG-DCT method;

FIG. 8 is a diagram explaining information for subsampling for encoding;

FIG. 9 is a diagram explaining information for subsampling for encoding;

FIGS. 33A and 33B are explanatory diagrams of an example of a quantization table used in the first conventional example;

FIG. 34 is a schematic diagram illustrating an image encoding apparatus in accordance with a second conventional example of the present invention;

FIG. 35 is a schematic diagram illustrating an image decoding apparatus in accordance with the second conventional example of the present invention;

DETAILED DESCRIPTION OF THE PREFERRED EMBODIMENTS

Figure 1:
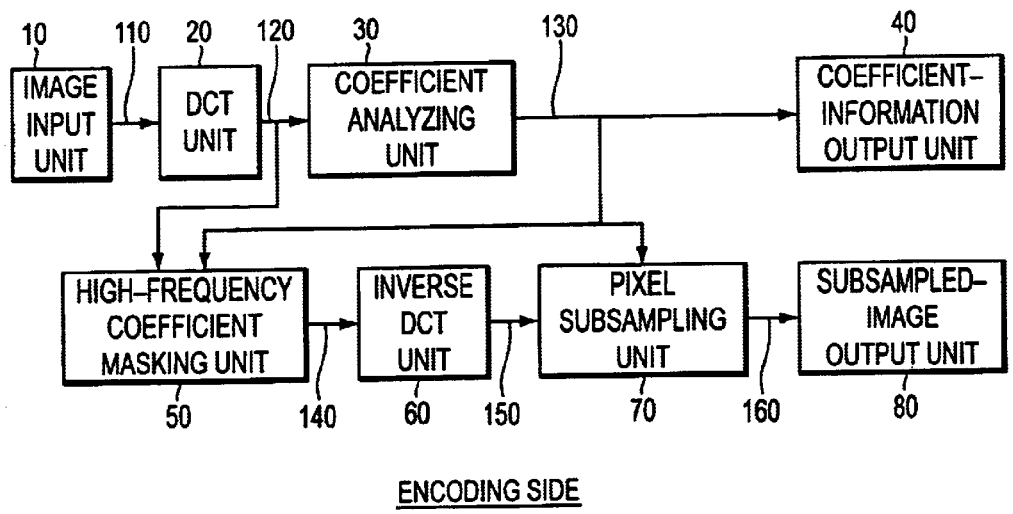
FIG. 1 is a schematic diagram illustrating an image encoding apparatus in accordance with a first embodiment of the present invention.

Hereafter, a description will be given of the embodiments of the present invention. First, a first embodiment using DCT will be described, and a second embodiment using a frequency transform technique other than DCT will then be described.

(First Embodiment)

Prior to giving a specific description of the first embodiment of the present invention, a description will be given of a basic concept of the present invention. The amount of data of a digital image is determined by the resolution and the number of bits per pixel. As for an image format, both the resolution and the number of bits are generally fixed by constants.

However, the amount of information of an image changes locally. For instance, where there is no change in the pixel value, a maximum resolution ifs not required, and the number of bits can be restricted. Namely, this means that a fixed image format contains redundant information.

In the case of a natural image, in particular, a maximum resolution of the image is restricted by the frequency characteristic and the resolution of a device for effecting digital transform. For example, in a case where a digital image inputted by a scanner having a resolution s is managed by an image format having a resolution 2s, the amount of essentially significant pixels is merely $s^2/(2s)^2=1/4$. This phenomenon becomes noticeable in obtaining a high resolution for an output device, enlargement processing of an image, and the like.

Accordingly, a case is considered in which an image is represented with an optimum resolution. A resolution required for a digital image is dependent upon a maximum frequency which the image possesses. For example, a pitch p of the resolution cannot be made shorter than a half length T/2 of a period T of the maximum frequency which the image possesses. If this is considered conversely, it can be said that an image which does not use up to a maximum frequency allowed by the resolution contains redundant pixels. Even if such redundant pixels are thinned out, the pixels can be interpolated afterwards by neighboring pixels insofar as the maximum frequency is known.

In the present invention, redundant components are suppressed and the amount of codes is reduced by representing an image with an optimum resolution on the basis of the above-described basic principle. The transform of the resolution into the aforementioned optimum resolution is realized by the subsampling of pixels. In addition, analytical processing for obtaining the optimum resolution is effected by frequency analysis. Encoding and decoding processing is effected with respect to the thinned-out image.

The basic principle of the present invention, if expressed by a formula, can be written as shown below. It is now assumed that all the frequency components v(f) of the image to be encoded become 0s above a certain frequency $f_s$.
[Mathematical Formula 4]

$$v(f)=0 (f>f_s) \quad (5)$$

The frequency fs can be determined by frequency analysis. Meanwhile, if it is assumed that the pitch of the image format is p, a maximum frequency $f_{max}$ which can be expressed becomes as follows, as described above.
[Mathematical Formula 5]

$$f_{max}=1/T_{max}=1/2P \quad (6)$$

Naturally, $f_s \leq f_{max}$. The pitch $p_s$ of the resolution necessary for expressing $f_s$ can be obtained from the following formula in the same way as Formula (6).
[Mathematical Formula 6]

$$p_s=T_s/2=1/2f_s \quad (7)$$

At this time, $f_s \leq f_{max}$; therefore, $p \geq p_s$. This very pitch $p_s$ indicates the maximum resolution referred to in the present invention.

Figure 27:
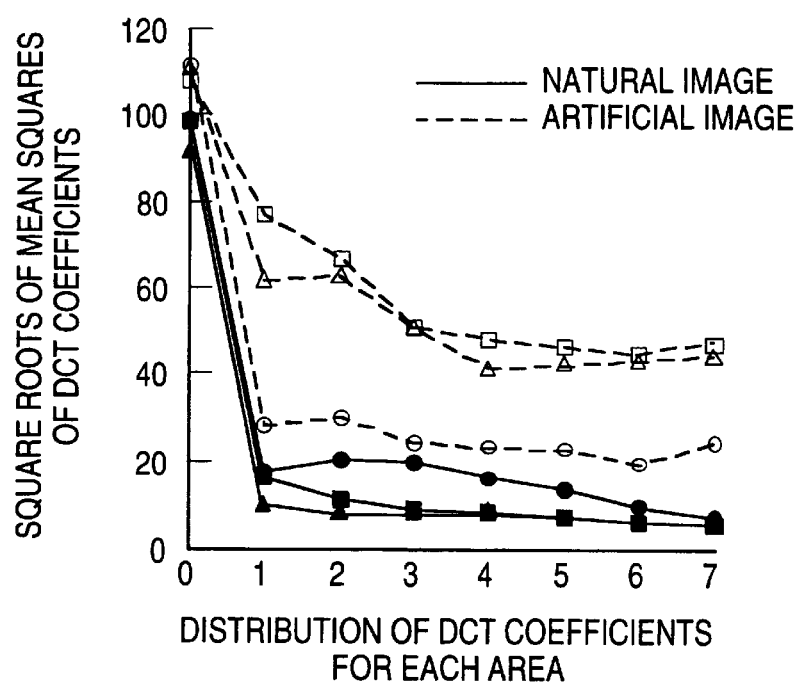
FIG. 27 is an explanatory diagram of an example of an experiment illustrating the characteristics of images.
Figure 28:
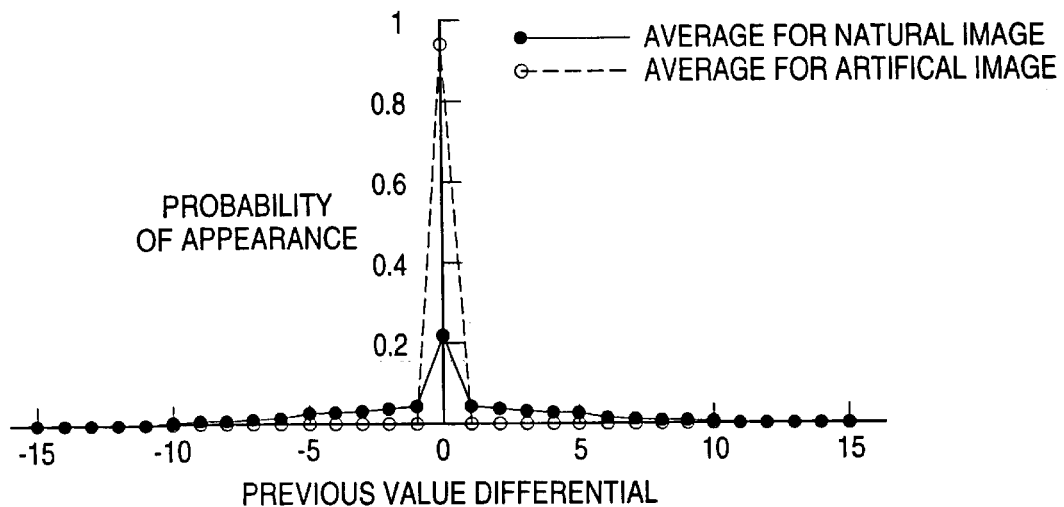
FIG. 28 is an explanatory diagram of an example of an experiment illustrating the characteristics of images.

The advantage of the present invention can be qualitatively explained as follows. In a case where an input is an artificial image, since information is contained in large volumes in high-frequency components as can be seen from FIG. 27, most of the pixels cannot be thinned out. However, since the image can be sufficiently compressed reversibly by predicative encoding or the like as described in the description of the second conventional example, no problem is presented even if such pixels cannot be thinned out. In addition, in a case where the input is a natural image, the high-frequency components may be quantized to some extent, as described in the first conventional example. Accordingly, the high-frequency components which are small in some measure may be ignored, and since the maximum frequency can be lowered, the necessary resolution, i.e., the number of pixels, can be made small as a result.

From the perspective of the present invention, the problems of the conventional examples can be expressed as follows. In the first conventional example, the quantization of frequency components is effected irrespective of the resolution which an image should essentially possess. Since the quantization of frequency components is an act which ignores small components as far as a high-frequency region is concerned, the quantization of frequency components is equivalent to forcibly lowering the resolution. Accordingly, this results in either the degradation of image quality with respect to an artificial image, for which a maximum resolution is partially required, or fine quantization with a resultant increase in the amount of codes.

On the other hand, the second conventional example is not able to reduce the amount of codes since a natural image is encoded with a high resolution which is not essentially required.

Further, in the third conventional example, since lossy encoding and lossless encoding are effected separately in a frequency space and a pixel value space which are utterly different spaces, problems pointed out in Description of the Related Art occur. In this respect, in the present invention, since all the image is processed from the common perspective of the resolution, such a distortion does not occur.

The schematic configuration of the present invention is as follows. The present invention is based on lossless predictive coding, and as for a natural image which requires quantization, loss (irreversibility) is realized by subsampling pixels in its prior stage. The subsampling processing of pixels is effected while determining whether the given image has an optimum resolution by means of the frequency analysis and quantization. With respect to an artificial image, on the other hand, since subsampling processing is ineffective, quantization is carried out strictly, and only the pixels which are not required for lossless encoding are thinned out.

Next, a specific description will be given of the operating principle of this embodiment. In this embodiment, DCT is used as simplified frequency analysis. DCT and its inverse transformation are expressed by Formulae (1) and (2) above. That is, the DCT coefficient y(u, v) is the linear sum of pixel values x(m, n), and in the case of 8×8 DCTs one DCT processing is expressed by writing out 64 formulae.

Here, the DCT coefficient corresponds to the frequency component within a block. Accordingly, if the fact that a certain block does not have a high-frequency component is expressed by a formula, and if it is assumed that u- and v-direction maximum frequencies are $f_u$ and $f_v$, respectively, this fact can be expressed as Formula (8) (where ($0 \leq f_u$, $f_v \leq 7$).

[Mathematical Formula 7]

$$y(u, v) = 0 (u > f_u \text{ or } v > f_v) \quad (8)$$

Since the number of DCT coefficients y(u, v) which satisfy Formula (8) is $(64-(f_u+1)\times(f_v+1))$, the left sides of $(64-(f_u+1)\times(f_v+1))$ formulae become 0. This corresponds to a reduction in the number of unknowns from 64 to $(f_u+1)\times(f_v+1)$ if DCT processing is considered as a simultaneous system of linear equations in which arguments are pixel values and unknowns are DCT coefficients. That is, since $(64-(f_u+1)\times(f_v+1))$ formulae become redundant, $(64-(f_u+1)\times(f_v+1))$ pixel values among the pixel values which are arguments can be eliminated by the operation of the formulae. Consequently, it can be appreciated that if only $(f_u+1)\times(f_v+1)$ pixel values are known, 64 DCT coefficients, hence, the pixel values, can be reconstructed afterwards by solving the simultaneous system of linear equations involved in DCT processing.

However, calculation accuracy is not taken into consideration here. In addition, although a description has been given of 64 simultaneous equations for simplification's sake, processing may be effected by considering the case as a combination of eight simultaneous equations which are two-dimensionally independent in the light of the nature of the two-dimensional DCT. In addition, the above facts also hold true of DCTs other than the 8×8 DCTs with the exception of constants.

In accordance with the above-described theory, ny pixels can be thinned out from the 8×8 blocks, but restrictions are imposed on the method of subsampling. Since the two-dimensional DCT is effected by a combination of one-dimensional DCTs, subsampling must be effected such that $(f_u+1)\times(f_v+1)$ pixels ultimately remain. However, in a configuration which is two-dimensionally independent and in which interpolation in the u-direction, for instance, is effected first, it suffices if $(f_v+1)$ pixels remain in the v-direction when the interpolation in the u-direction interpolation is finished. Although no restriction is imposed on the interval of the pixels at this time, since the pixel values can be provided with only integer accuracy, if spatially close pixels are left, there are cases where the accuracy of values of interpolated pixels declines.

The foregoing logic is expressed by a formula by using one-dimensional DCT of 8 pixels for the sake of simplicity. First, as a transformation formula of one-dimensional DCT, Formula (9) can be readily derived from Formula (1).

[Mathematical Formula 8]

$$y(u) = \frac{c(u)}{2} \sum_{m=0}^{7} (x(m) - 128) \cos\frac{(2m+1)u\pi}{16} \quad (9)$$

Since Formula (9) is in the form of a mere sum of products, Formula (9) can be expressed as a matrix. If the term of cos is expressed as d(u, m), we obtain Formula (10).

[Mathematical Formula 9]

$$\begin{pmatrix} y(0) \\ y(1) \\ \vdots \\ y(7) \end{pmatrix} = \frac{c(u)}{2} \begin{pmatrix} d(0,0) & d(0,1) & \cdots & d(0,7) \\ d(1,0) & d(1,1) & \cdots & \\ \vdots & \vdots & & \vdots \\ d(7,0) & & \cdots & d(7,7) \end{pmatrix} \begin{pmatrix} x(0) - 128 \\ x(1) - 128 \\ \vdots \\ x(7) - 128 \end{pmatrix} \quad (10)$$

Here, if it is assumed that $f_u = 2$, then $y(u) = 0 (u > 2)$, so that Formula 10 is rewritten as

[Mathematical Formula 10]

$$\begin{pmatrix} y(0) \\ y(1) \\ y(2) \\ 0 \\ \vdots \end{pmatrix} = \frac{c(u)}{2} \begin{pmatrix} d(0,0) & d(0,1) & \cdots & d(0,7) \\ d(1,0) & d(1,1) & \cdots & \\ \vdots & \vdots & & \vdots \\ d(7,0) & & \cdots & d(7,7) \end{pmatrix} \begin{pmatrix} x(0) - 128 \\ x(1) - 128 \\ \vdots \\ x(7) - 128 \end{pmatrix} \quad (11)$$

Since the left sides of the lower five equations in Formula (11) are fixed at 0, if they are substituted in the upper three equations, the variables on the right side can be deleted. For example, if x(7) is deleted from x(3), Formula (12) can be obtained as a result.

[Mathematical Formula 11]

$$\begin{pmatrix} y(0) \\ y(1) \\ y(2) \end{pmatrix} = \frac{c(u)}{2} \begin{pmatrix} d'(0,0) & d'(0,1) & d'(0,2) \\ d'(1,0) & d'(1,1) & d'(1,2) \\ d'(2,0) & d'(2,1) & d'(2,2) \end{pmatrix} \begin{pmatrix} x(0) - 128 \\ x(1) - 128 \\ x(2) - 128 \end{pmatrix} \quad (12)$$

If the three pixel values of x(0), x(1), and x(2) can be known from Formula (12), y(0), y(1), and y(2) can be determined. Since it is known that y(3) through y(7) are 0, x(3) through x(7) can then be interpolated by an inverse transformation of Formula (9). Since no restrictions are imposed on the manner of selection of variables that are deleted in Formula (11), any combination may be adopted as the pixel values which are selected for the right side of Formula (12) insofar as the number of pixel values agrees. Nevertheless, there is the nature that the wider the interval as described above, the higher the accuracy of the interpolation.

An example of the method subsampling is shown in FIGS. 5A to 5D. FIG. 5A clearly satisfies the above-described conditions. In FIG. 5B, decoding is possible by first effecting interpolation in the u-direction and then effecting interpolation in the v-direction. Neither FIG. 5C nor FIG. 5D satisfies the restrictions.

A description will be given of the extension of the subsampling method. In the above, for the sake of simplicity a description has been given of subsampling which is based on Formula (8). In fact, Formula (8) expresses well the concept of the present invention which has been described in the beginning of this embodiment. In this embodiment, however, since the interpolation processing can be reduced to a simultaneous system of equations, Formula (8) can be extended. That is, even if the frequency is $f_u$ or less, in a case where a frequency $fs_u$ whose component becomes 0 irrespective of the v component, eight equations concerning the frequency $fs_u$ can be deleted from the simultaneous system of equations. Therefore, the number of pixels to be left in the u direction can be reduced to $f_u$. $fs_u$ may be plural. Also, the same holds true of the v direction.

In addition, although subsampling processing which is independently based on $f_u$ and $f_v$ was effected in the above, both axes may be adjusted to the higher one of the frequencies $f_u$ and $f_v$. As a result, the number of pixels which can be thinned out decreases, but since the patterns which are thinned out also decrease, processing such as coefficient analysis processing and interpolation processing can be simplified. Of course, if the degradation of the image quality is allowed, values such as average values or minimum values of $f_u$ and $f_v$ may be used. Still alternatively, a similar advantage can be obtained if appropriate quantization is effected by using any of 0, 1, 3, and 7 as the values of $f_u$ and $f_v$.

Incidentally, since Formula (8) is written as being dependent upon the maximum frequencies in the $f_u$- and $f_v$-directions, an area of effective frequency components forms a rectangle on the DCT coefficient blocks. This is ascribable to the fact that the two-dimensional DCT is realized by a combination of one-dimensional DCTs. If the bases of the two-dimensional transforms are completely independent from each other, the area can be extended to a free shape other than the rectangle. For instance, a restriction may be imposed in such a manner as to leave only upper left triangular components in the frequency components. In this case, there are no longer restrictions on the subsampling method.

A description will be given of the quantization of the DCT coefficients. As described in the description of the JPEG-DCT method, in the frequency transform coding, the amount of codes can be reduced in a state in which the degradation of the image quality is suppressed by coarsely quantizing high-frequency components. In this embodiment as well, it is possible to apply the quantization processing using, for example, the quantization table shown in FIGS. 33A and 33B. Although the frequency components which become 0 as a result of quantization increase, the above-described basic principle can be applied substantially as it is.

Hence, a description will be given of a specific procedure of application of quantization. In the present invention, the frequency transform is used only in the analysis of an image, and actual quantization is realized by subsampling of pixels. Accordingly, the quantization of frequency components is, to be strict, realized by threshold processing with respect to absolute values. That is, processing is effected in which each frequency component is compared with a quantization step, and if smaller, the frequency component is set to 0. If the quantization table is set appropriately, by subjecting threshold-processed coefficient data to inverse DCT processing, it is possible to obtain an image which is free of the degradation of image quality and in which high-frequency components are limited. Thereafter, it suffices if the above-described basic principle is applied as it is. To sum up, the following procedure is taken.

(Algorithm When Quantizing Coefficient Data)

Step 1: DCT processing is effected.

Step 2: The coefficient data is subjected to threshold processing, and components which are smaller than the quantization step is set to 0. Maximum frequency components at this time are set as $f_u$ and $f_v$.

Step 3: Inverse DCT processing is effected.

Step 4: Subsampling processing is effected on the basis of $f_u$ and $f_v$ determined in Step 2. If the image remains, the operation returns to Step 1.

In Step 2, components which happen to be subjected to threshold processing to 0 are generated at frequencies below $f_u$ and $f_v$. In this algorithm, since the subsampling processing in Step 4 is based on $f_u$ and $f_v$ determined in Step 2, even if such components are compulsively not set to 0, the amount of processing does not change in both subsampling and interpolation processing. Accordingly, the following processing may be interposed between Step 2 and Step 3.

Among frequency components below $f_u$ and $f_v$, if there are those which have been subjected to threshold processing, such frequency components are returned to data persisting prior to threshold processing.

In the present invention, a compressing means for predictive coding or the like is assumed in a later stage. Since the number of pixels which are sent to the later stage can be reduced on the basis of the above-described basic principle, the processing in the later stage can be alleviated as an auxiliary effect of the present invention. Since this is effective when image processing, such as color transform, enlargement/reduction, rotation, and clipping, is effected in a later stage, the present invention can be applied as an accelerator for image processing.

Since a description has been given of the basic principle, a specific description will now be given of this embodiment. Hereafter, a description will be given of a portion for effecting the subsampling of pixels with respect to a natural image, excluding the aforementioned later stage.

Figure 2:
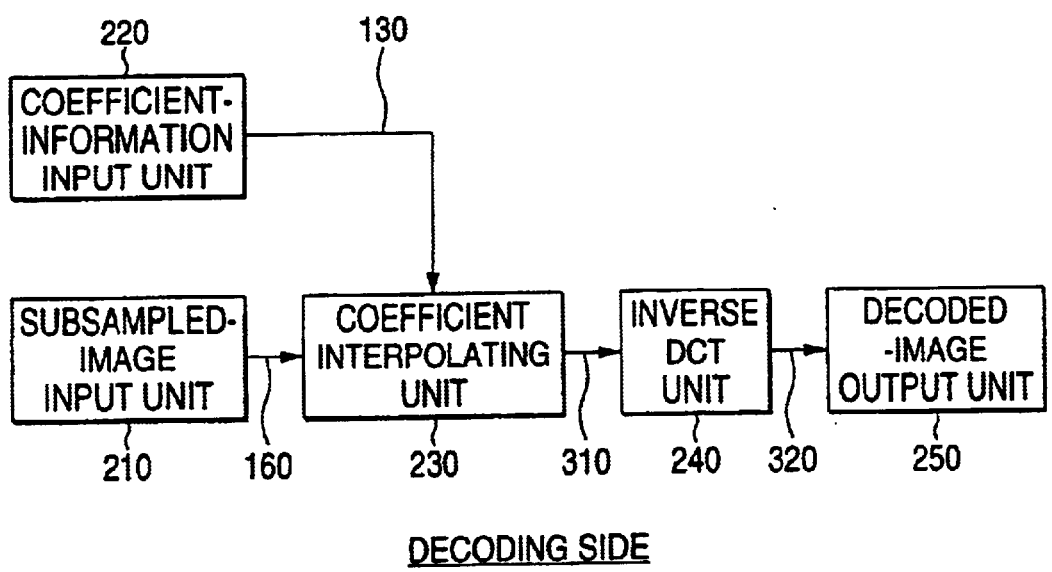
FIG. 2 is a schematic diagram illustrating an image decoding apparatus in accordance with the first embodiment of the present invention.
Figure 29:
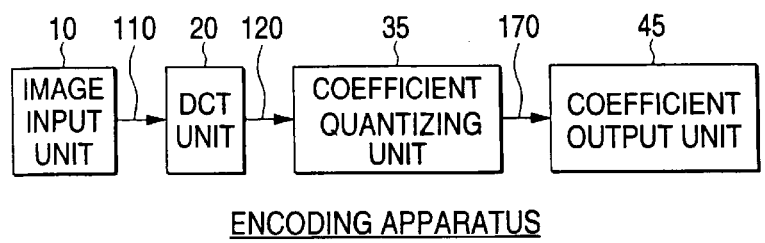
FIG. 29 is a schematic diagram illustrating an image encoding apparatus in accordance with the first conventional example of the present invention.
Figure 30:
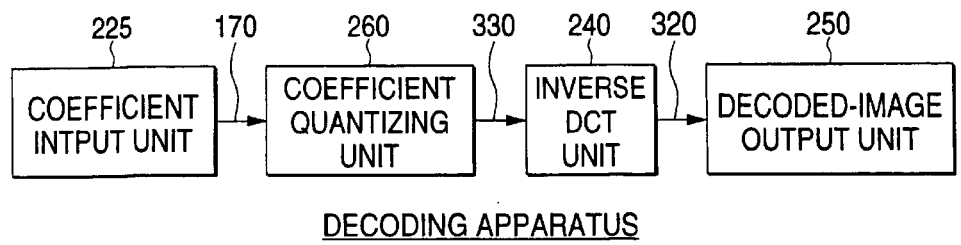
FIG. 30 is a schematic diagram illustrating an image decoding apparatus in accordance with the first conventional example of the present invention.
Figure 31:
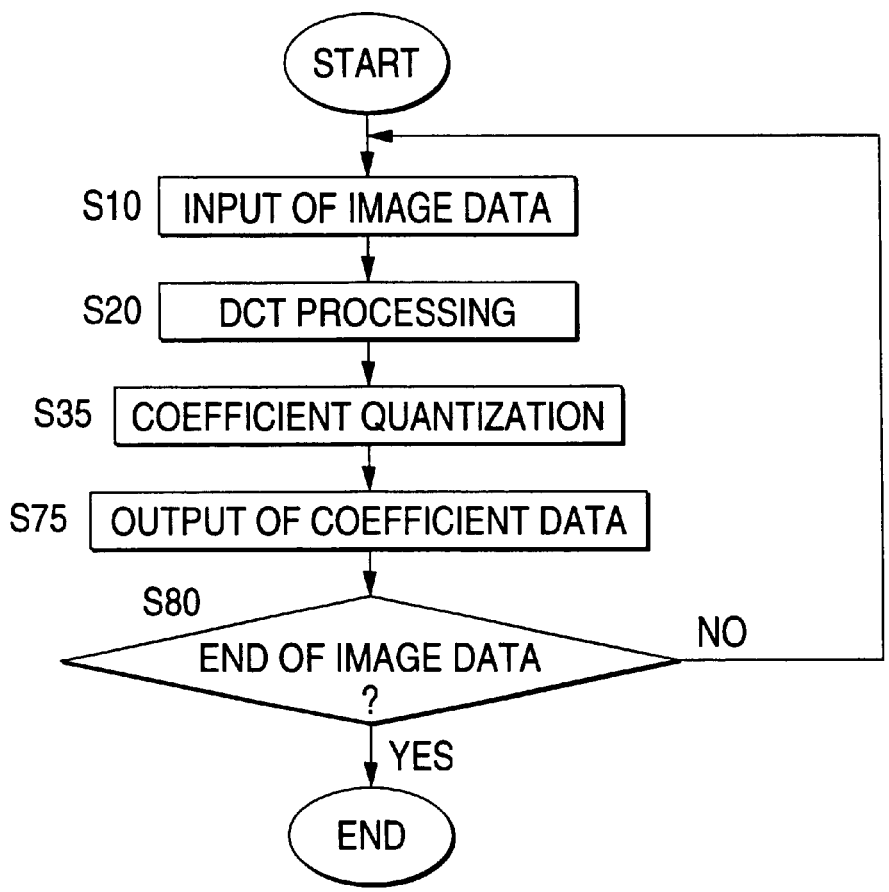
FIG. 31 is a flowchart illustrating an example of the operation of encoding processing by the image encoding apparatus in accordance with the first conventional example.
Figure 32:
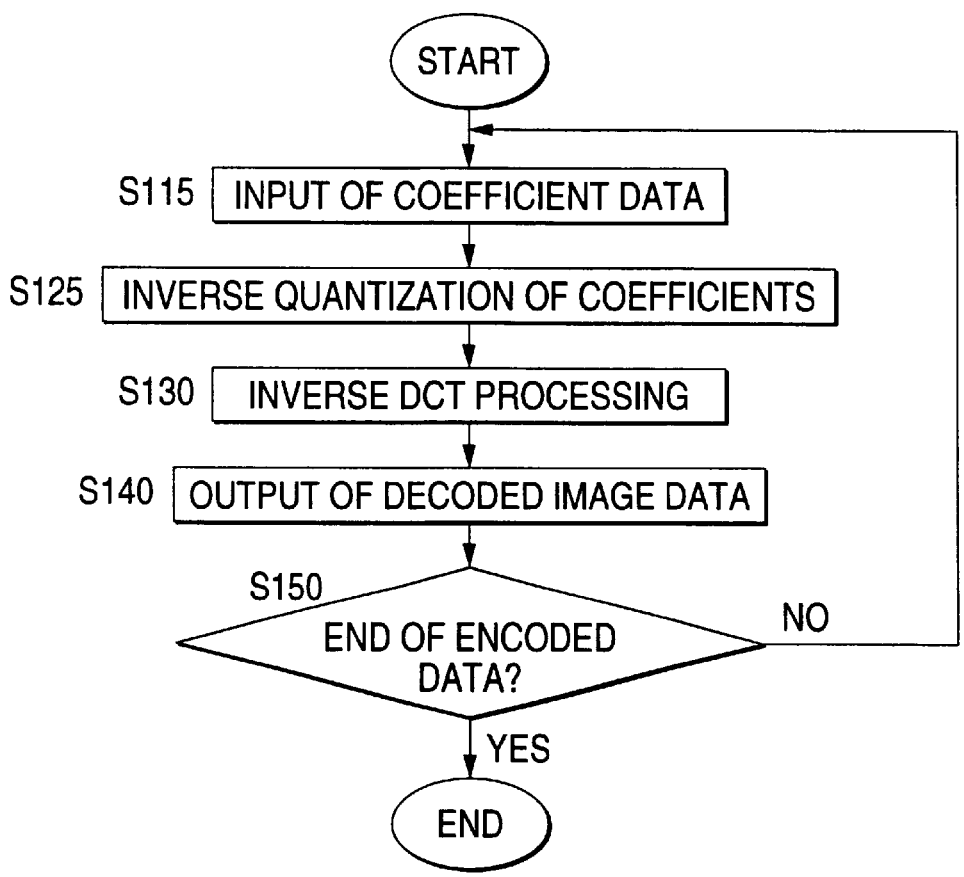
FIG. 32 is a flowchart illustrating an example of the operation of decoding processing by the image decoding apparatus in accordance with the first conventional example.
Figure 36:
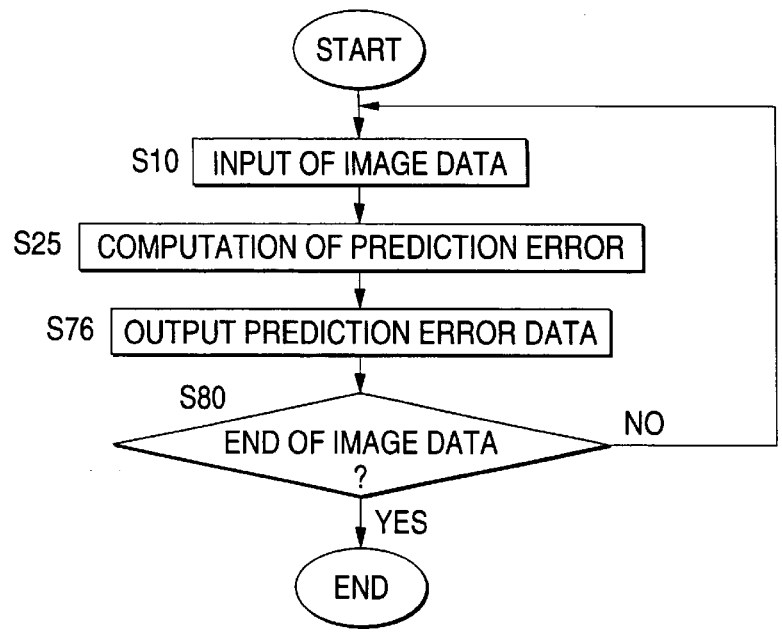
FIG. 36 is a flowchart illustrating an example of the operation of encoding processing by the image encoding apparatus in accordance with the second conventional example.
Figure 37:
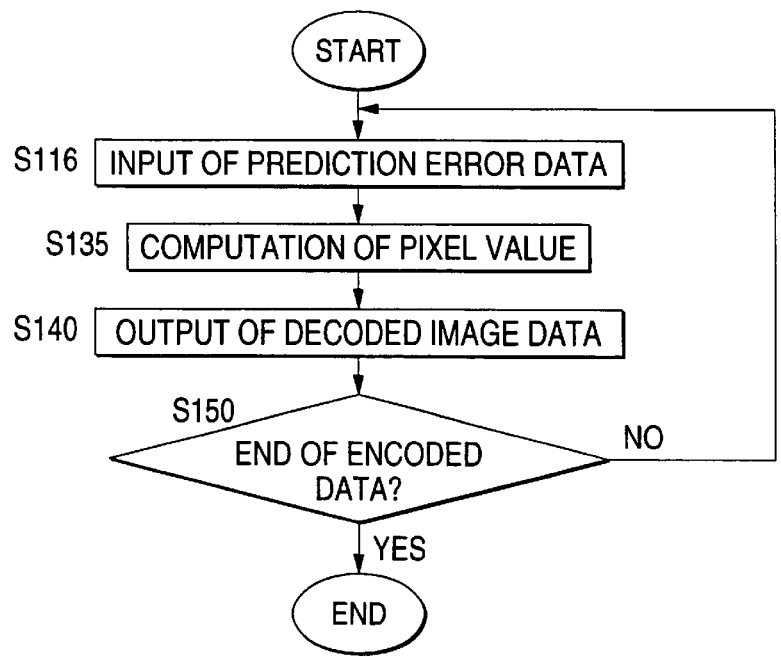
FIG. 37 is a flowchart illustrating an example of the operation of decoding processing by the image decoding apparatus in accordance with the second conventional example.
Figures 38, 39A, 39B:
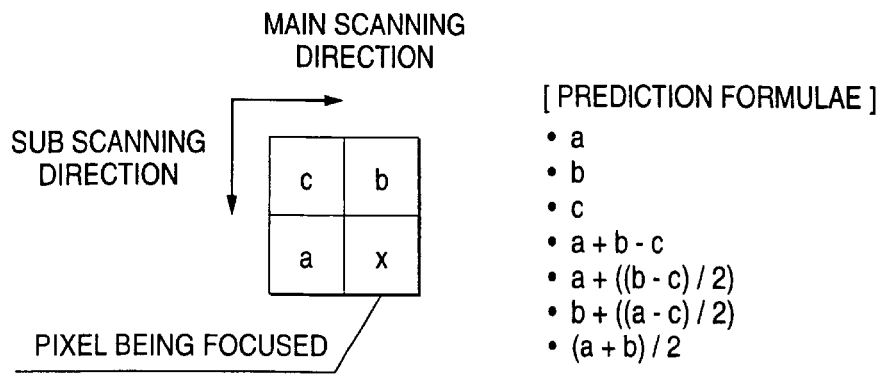
FIG. 38 is an explanatory diagram of predictors used in the second conventional example.
FIGS. 39A and 39B are explanatory diagrams on mosquito noise.
Figure 40:
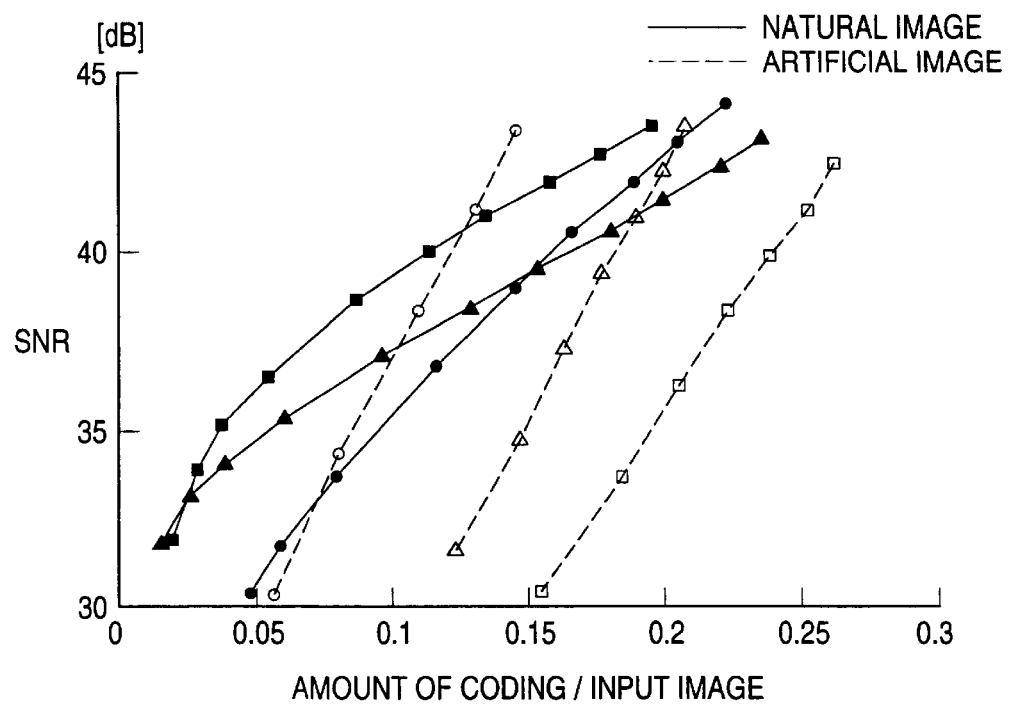
FIG. 40 is an explanatory diagram of an example of an experiment in accordance with the first conventional example.
Figure 41:
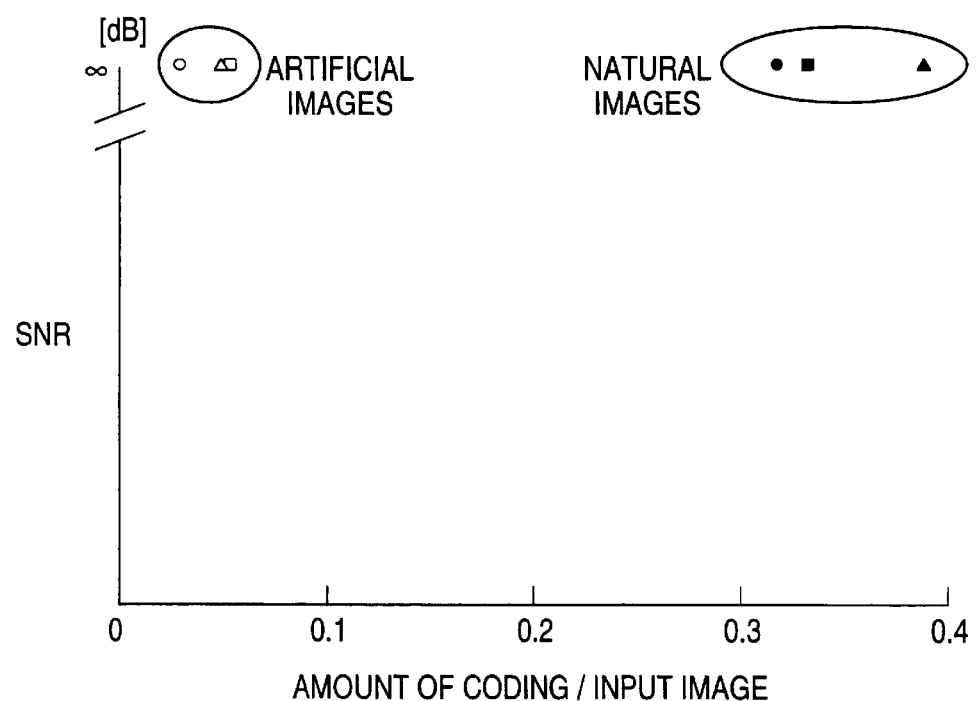
FIG. 41 is an explanatory diagram of an example of an experiment in accordance with the second conventional example.
Figure 42:
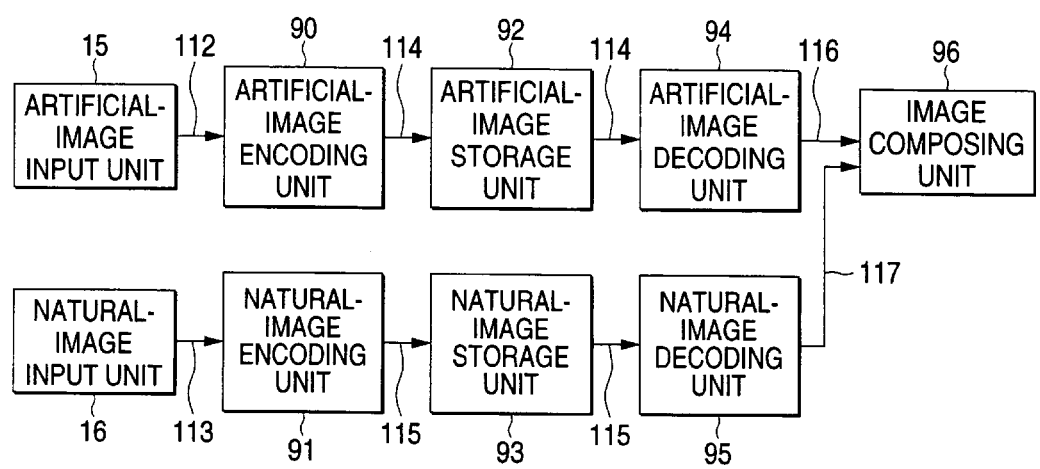
FIG. 42 is a schematic diagram illustrating a third conventional example.

FIGS. 1 and 2 are block diagrams illustrating a first embodiment of the present invention. In the drawings, portions which are similar to those of FIGS. 29 and 30 will be denoted by the same reference numerals, and a description thereof will be omitted. In FIGS. 1 and 2, reference numeral 30 denotes a coefficient analyzing unit; 40, a coefficient analysis output unit; 50, a high-frequency coefficient masking unit; 60, an inverse DCT unit; 70, a pixel subsampling unit; 80, a subsampled-image output unit; 130, analyzed coefficient data; 140, low-frequency coefficient data; 150, low-frequency image data; 160, subsampled image data; 210, a subsampled-image input unit; 220, a coefficient analysis input unit; 230, a coefficient interpolating unit; and 310, interpolated coefficient data.

A description will be given of the various units shown in FIGS. 1 and 2. The encoding apparatus shown in FIG. 1 has the following configuration. The coefficient analyzing unit 30 makes a comparison between predetermined constants and coefficient data 120, and sends the results of comparison as the analyzed coefficient data 130 to the coefficient analysis output unit 40, the high-frequency coefficient masking unit 50, and the pixel subsampling unit 70, respectively. The coefficient analysis output unit 40 outputs the analyzed coefficient data 130 to an external circuit. The high-frequency coefficient masking unit 50 replaces some of the high-frequency coefficients of the coefficient data 120 with 0s on the basis of the analyzed coefficient data 130, and sends the same as the low-frequency coefficient data 140 to the inverse DCT unit 60. The inverse DCT unit 60 effects inverse DCT processing, which is the inverse transformation of DCT processing effected by the DCT unit 20, with respect to the low-frequency coefficient data 140, and sends the result to the pixel subsampling unit 70 as the low-frequency image data 150. The pixel subsampling unit 70 effects subsampling processing with respect to the low-frequency image data 150 on the basis of a preset subsampling method and the analyzed coefficient data 130, and sends the result to the subsampled-image output unit 80 as the subsampled image data 160. The subsampled-image output unit 80 sends the subsampled image data 160 to an external circuit.

Next, the decoding apparatus shown in FIG. 2 has the following configuration. The subsampled-image input unit 210 receives the subsampled image from the external circuit, and sends the same to the coefficient interpolating unit 230 as the subsampled image data 160. The coefficient analysis input unit 220 receives the analyzed coefficient data from the external circuit, and sends the same to the coefficient interpolating unit 230 as the analyzed coefficient data 130. The coefficient interpolating unit 230 effects interpolation processing of the DCT coefficients with respect to the subsampled image data 160 on the basis of the analyzed coefficient data 130, and sends the result to an inverse DCT unit 240 as the interpolated coefficient data 310. The inverse DCT unit 240 effects inverse DCT processing with respect to the interpolated coefficient data 310, and sends the result to a decoded-image output unit 250 as decoded image data 320.

A description will be given of the operation of the first embodiment on the basis of the above-described configuration. FIGS. 3 and 4 are flowcharts illustrating the operation of the first embodiment of the present invention.

First, a description will be given of the encoding procedure of this embodiment with reference to FIG. 3. In S10, an image is inputted to an image input unit 10 from an external circuit, thereby obtaining input image data 110. In S20, DCT processing is effected in a DCT unit 20, thereby obtaining the coefficient data 120. In S30, the coefficient analyzing unit 30 makes a comparison between the coefficient data 120 and the predetermined constants, and obtains the result as the analyzed coefficient data 130. In S40, the high-frequency coefficient masking unit 50 replaces some of the high-frequency coefficients of the coefficient data 120 with 0s on the basis of the analyzed coefficient data 130, and sets the same as the low-frequency coefficient data 140. In S50, the inverse DCT unit 60 effects inverse DCT processing with respect to the low-frequency coefficient data 140, thereby obtaining the low-frequency image data 150. In S60, the pixel subsampling unit 70 effects the subsampling processing of pixels on the basis of the analyzed coefficient data 130, thereby obtaining the subsampled image data 160. In S70, the coefficient analysis output unit 40 and the subsampled-image output unit 80 respectively output the analyzed coefficient data 130 and the subsampled image data 160 to external circuits. In S80, a determination is made as to whether or not all the input image data 110 inputted in S10 has been processed, and if unprocessed data remains, the operation returns to S10, while if all the input image data 110 has been processed, the encoding procedure ends.

Next, a description will be given of the decoding procedure of this embodiment with reference to FIG. 4. In S110, the subsampled-image input unit 210 and the coefficient analysis input unit 220 respectively receive the subsampled image data 160 and the analyzed coefficient data 130 from the external circuits. In S120, the coefficient interpolating unit 230 obtains the interpolated coefficient data 310 on the basis of the subsampled image data 160 and the analyzed coefficient data 130. In S130, the inverse DCT unit 240 effects inverse DCT processing with respect to the interpolated coefficient data 310, thereby obtaining the decoded image data 320. In S140, the decoded-image output unit 250 outputs the decoded image data 320 to an external circuit. In S150, a determination is made as to whether or not all the subsampled image data 160 and analyzed coefficient data 130 which were inputted in S110 have been processed, and if unprocessed data remains, the operation returns to S110, while if all the inputted data have been processed, the decoding procedure ends.

A description will be given of the coefficient analyzing processing in the above-described operation. In the coefficient analyzing processing, constants which are coarse with respect to high-frequency coefficients, as in quantization tables used in the JPEG-DCT method, are used. However, the effectiveness of the DCT coefficients is judged not by the quantization as described above but by mere threshold processing.

Referring to FIGS. 6A to 6E, a description will be given of the flow of coefficient analysis processing in a case where a recommended table of the JPEG-DCT method is used. FIG. 6A is an example of the coefficient data 120 obtained by DCT processing. If the quantization of the JPEG-DCT method is effected with respect to this coefficient data, quantized coefficient data shown in FIG. 6B is obtained. Since threshold processing is effected in this embodiment, if effective coefficients are expressed by 1s and ineffective coefficients by 0s, the analyzed coefficient data 130 such as the one shown in FIG. 6C is obtained.

As described in the beginning of the description of this embodiment, since the number of pixels which can be thinned out is determined by maximum frequencies in the u- and v-directions, even if this information is set as shown in FIG. 6D, necessary information is not lost. In addition, as a format, the data may be abbreviated such as (4, 4). The low-frequency coefficient data 140 which is prepared by the high-frequency coefficient masking unit 50 on the basis of this analyzed coefficient data 130 becomes as shown in FIG. 6E.

In addition, during the operation, the coefficient interpolation processing which is effected by the coefficient interpolating unit 230 is carried out by solving the simultaneous system of equations, as described in the beginning of the description of this embodiment. Incidentally, as for the simultaneous system of equations which are selected, there is only a combination of 64 simultaneous equations in the case of, for example, 8×8 blocks, so that if an inverse matrix is determined in advance, processing can be effected simply.

In addition, during the operation, as it has already been described that it is assumed that the subsampled image data 160, which is outputted in S70, is encoded by the encoding apparatus in a later stage, the analyzed coefficient data 130 may be encoded by some entropy coding in a similar manner.

As described above, in accordance with this embodiment, it is possible to effectively encode a natural image irreversibly by using lossless encoding in a later stage. In encoding an artificial image, it suffices if all the values of the quantization table used in threshold processing, which is effected by the coefficient analyzing unit 30 of the encoding apparatus shown in FIG. 1, are set to 0s. Since the quantization of the coefficient data is not carried out as a result, if there are no calculation errors, the encoding apparatus shown in FIG. 1 operates as a lossless encoding apparatus. Of course, it is possible to separately provide a data path for bypassing the configuration shown in FIG. 1 when an artificial image is inputted.

In addition, the processing in the high-frequency coefficient masking unit 50 and the inverse DCT unit 60 of the encoding apparatus shown in FIG. 1, in final analysis, becomes the same processing as cutting a high-frequency region of the image inputted by the image input unit 10, i.e., low-pass filter processing. Accordingly, it is also possible to make the high-frequency coefficient masking unit 50 and the inverse DCT unit 60 low-pass filters.

(First Example of Extension)

A description will be given of the extension of this embodiment. As a point of difference in the decoded image between the JPEG-DCT method and this embodiment, it is possible to cite that in contrast to the fact that in the JPEG-DCT method all the pixel values can possibly vary subtly from those of the input image, in this embodiment the pixels which were not thinned out are sent as they are to the decoding side. As an example, average absolute values of differences between a decoded image and an input image in accordance with the JPEG-DCT method were taken with respect to a number of natural images. FIG. 7 shows the results in which these average absolute values were classified in layers according to the results of analysis of the coefficient data. The results of coefficient analysis on the abscissa were computed by the following formula.

[Mathematical Formula 12]

$$(\text{Analysis type}) = f_u + f_v \times 8 \quad (13)$$

In the above-described example, since the image subjected to inverse DCT processing is outputted as it is as a decoded image, there are cases where even in the case of pixels which were not thinned out pixel values deviate due to calculation errors and the like. In this embodiment, before this decoded image is outputted, the pixels which were not thinned out can be newly returned to their intrinsic pixel values. In the case where such processing is interposed, an utterly identical subsampled image is obtained by effecting subsampling in a similar manner when re-coding is effected. Accordingly, even if encoding and decoding are repeated, it is possible to realize lossy encoding in which the degradation of the image quality does not overlap. This is the first example of extension of this embodiment.

To thin out the same pixels as those of the initial encoding at the time of re-coding, it suffices if information on the subsampling method is included in the coefficient information data 130 and the subsampled image data 160. FIG. 8 is an example of such a data format. In this example, data concerning a subsampling technique is included as a header. This subsampling technique data may be one in which subsampling methods corresponding to the coefficient information data 130 are enumerated as shown in FIG. 9, or may be one in which preset IDs are simply indicated. It goes without saying that if encoding and decoding are repeated by an encoding apparatus in which subsampling methods are not dependent upon conditions other than the coefficient information data 130, such a scheme is not necessary.

Figure 10:
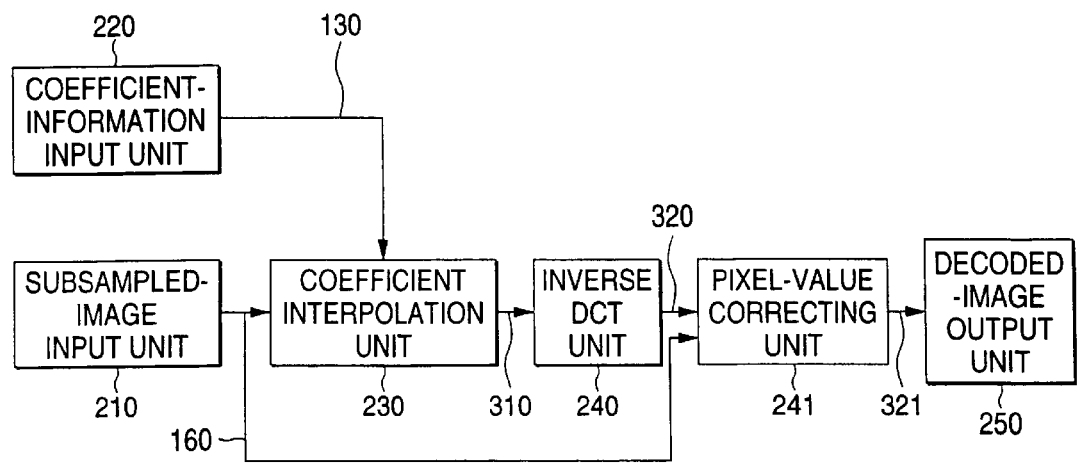
FIG. 10 is a schematic diagram illustrating an example of extension in the first embodiment of the present invention.

FIG. 10 shows a schematic diagram of a decoding apparatus in the first example of extension of this embodiment. In the drawing, those portions which are similar to those of FIG. 1 are denoted by the same reference numerals, and a description thereof will be omitted. Reference numeral 241 denotes a pixel-value correcting unit, and numeral 321 denotes corrected decoded image data.

A description will be given of the respective units shown in FIG. 10. Of the decoded image data 320, the pixels imparted by the subsampled image data 160 are replaced with the pixel values of the subsampled image data 160 by the pixel-value correcting unit 241. The result is sent to the decoded-image output unit 250 as the corrected decoded image data 321. Since the description of other portions and of the operation is largely similar to the above-described description, a description thereof will be omitted.

(Second Example of Extension)

Returning to the extension of this embodiment, if consideration is given by following the pattern of the JPEG-DCT method as seen in FIG. 7 referred to earlier, it can be expected that even if pixel values are quantized during predictive encoding in a stage following this embodiment, not much influence will be exerted on the image quality. Since it can be considered that the quantization which is allowed here is dependent upon the threshold processing which is effected with respect to frequency components, if the two processes are controlled in association with each other, efficient quantization is possible. The example of FIG. 7 referred to earlier is the result in which threshold processing is effected fixedly by using the quantization table shown in FIG. 33A, and it is possible to ascertain the tendency of the absolute values of decoding errors through the results of analysis of the coefficient data. The pixel-value quantization processing may be effected by using this as a reference. For example, if it is estimated that the quantization step is two times the average of error values on the assumption that errors occur with a uniform distribution, Formula (14) holds for each analysis type.

[Mathematical Formula 13]

$$\text{(Quantization step)} = \text{(average of absolute values of decoding error)} \times 2 \quad (14)$$

If the error distribution has a deviation centering on 0, for example, 2 in Formula(14) may be a slightly smaller value. At any rate, this value can be experimentally calculated by statistical processing. Of course, Formula (14) may be calculated by nonlinear operation by incorporating a more complicated assumption. Described above is the second example of extension of this embodiment.

Figure 11:
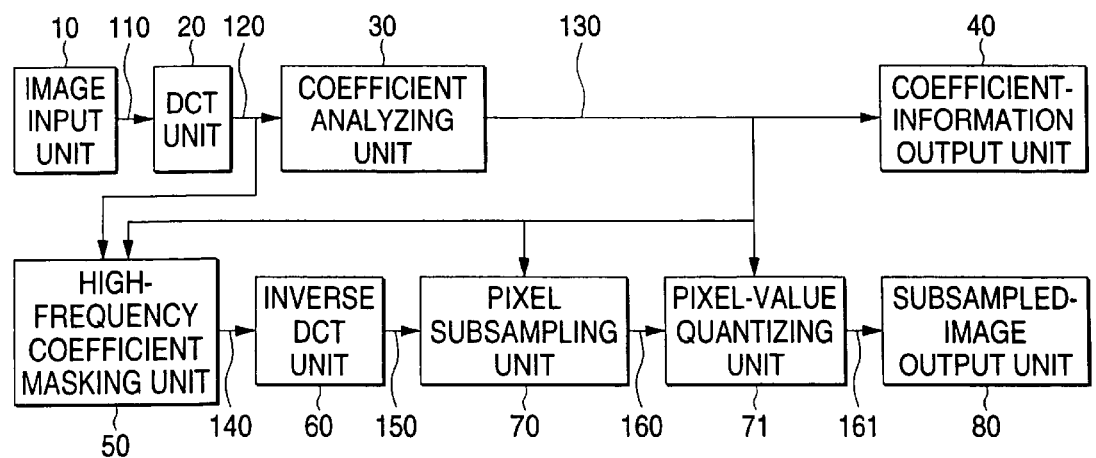
FIG. 11 is a schematic diagram illustrating an example of extension in the first embodiment of the present invention.

FIG. 11 shows a schematic diagram of an encoding apparatus in the second example of extension of this embodiment. In the drawing, those portions which are similar to those of FIG. 1 are denoted by the same reference numerals, and a description thereof will be omitted. Reference numeral 71 denotes a pixel-value quantizing unit, and numeral 161 denotes quantized subsampled image data.

A description will be given of the respective units shown in FIG. 11. The pixel-value quantizing unit 71 quantizes pixel values with respect to the decoded image data 160 by a predetermined technique on the basis of the threshold values used in the coefficient analyzing unit 30 and the analyzed coefficient data 130, and sends the result to the subsampled-image output unit 80 as the quantized decoded image data 161. Since the description of other portions and of the operation is largely similar to the above-described description, a description thereof will be omitted.

In the above-described example, the quantization in the pixel-value quantizing unit 71 may, of course, be fixed without being related to threshold values and the analyzed coefficient data 130.

(Third Example of Extension)

A description will be given of a third example of extension of this embodiment. It has already been described that both lossy encoding and lossless encoding can be executed by controlling the threshold values used in coefficient analysis processing. Hereafter, a modification in which such threshold control is effected dynamically will be described as the third example of extension.

Figure 12:
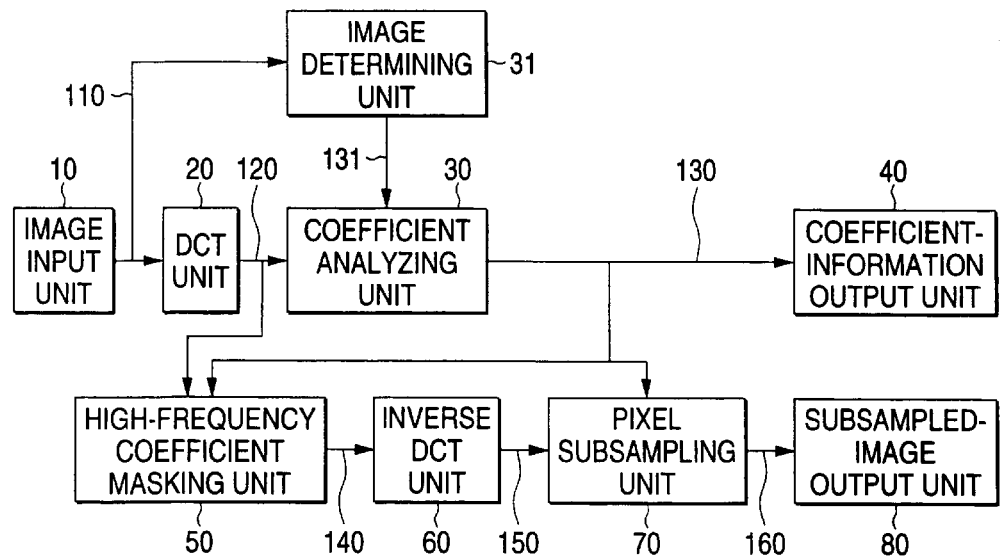
FIG. 12 is a schematic diagram illustrating another example of extension in the first embodiment of the present invention.

FIG. 12 is a schematic diagram of the third example of extension of this embodiment. In the drawing, reference numeral 31 denotes an image determining unit, and numeral 131 denotes threshold control data.

A description will be given of the respective units shown in FIG. 12. The image determining unit 31 determines an image with respect to the input image data 110 by a predetermined technique, and sends the result to the coefficient analyzing unit 30 as the threshold control data 131. Since the description of other portions and of the operation is largely similar to the above-described description, a description thereof will be omitted.

The image determining unit 31 determines a natural image and an artificial image. Specifically, the presence or absence of noise can be estimated from the manner of spread of the distribution of pixel-values, entropy of lower bits, the sharpness of the edge, and the like, so that the determination is made on the basis thereof. Although not illustrated, a configuration may be provided such that a distinction between a natural image and an artificial image is sent from an external circuit as side information. In this case, the image determining unit 31 effects transform of the side information into the threshold control data 131.

Such threshold control may be effected for each image or for each location of the image. In addition, control may be provided on the basis of local nature of the image without adhering to the distinction between the natural image and the artificial image. For instance, the distribution of pixel values and frequency components, the sharpness of the edge, the presence or absence of a pattern, the presence or absence of a fine line, the presence or absence of a gradation, and the like can serve as indices.

(First Simplification)

Next, a description will be given of the simplification of this embodiment. In the decoding apparatus shown in FIG. 2, a means for directly interpolating the pixel values may be provided instead of the coefficient interpolating unit 230 and the inverse DCT unit 240. The means for interpolating the pixel values referred to herein may be any interpolating means insofar as it is capable of interpolating the pixel values, such as the nearest-neighbor interpolation, 4-point linear interpolation, and 9-point second-order interpolation. In this case, since the basic principle of this embodiment still does not apply, the degradation of the image quality is unavoidable. In principle, however, the coefficient interpolation processing which is carried out in this embodiment has an effect similar to that of a low-pass filter on the DCT coefficients, and the pixel-value interpolation processing enumerated above also has an effect similar to that of a low-pass filter, so that the two approximations can be regarded as very simple approximations. Described above is the first example of simplification of this embodiment.

Figure 13:
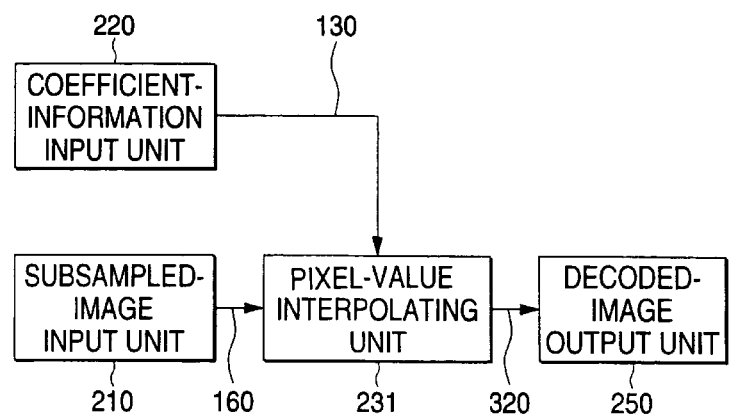
FIG. 13 is a schematic diagram illustrating an example of simplification in the first embodiment of the present invention.

FIG. 13 is a schematic diagram of the first example of simplification of this embodiment. In the drawing, those portions which are similar to those of FIG. 2 are denoted by the same reference numerals, and a description thereof will be omitted. Reference numeral 231 denotes a pixel-value interpolating unit.

A description will be given of the respective units shown in FIG. 13. The pixel-value interpolating unit 231 interpolates the pixels which were thinned out with respect to the subsampled image data 160 by a predetermined technique, and sends the result to the decoded-image output unit 250 as the decoded image data 320. Since the description of other portions and of the operation is largely similar to the above-described description, a description thereof will be omitted.

As described above, since the pixel-value interpolation in the first example of simplification has an effect similar to that of a low-pass filter, even if the same number of pixels are thinned out, this pixel-value interpolation is dependent upon the pixels which are selected, so that there is a possibility of causing a difference in the image quality. In addition, it has already been described that if restrictions are observed, the selection of pixels can be effected freely to some extent. Accordingly, if, for example, adjustment is made in such a manner as to select peak values within the blocks when selecting the pixels to be left, it becomes possible not to impair dynamic ranges of the blocks.

Figure 14:
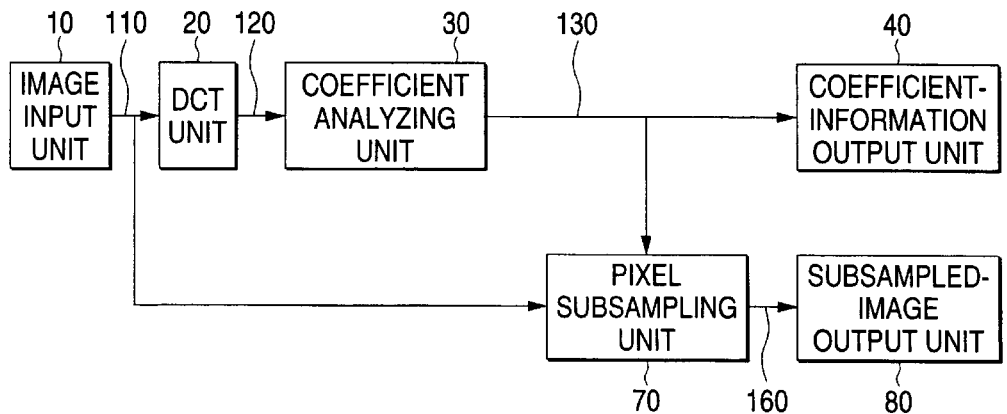
FIG. 14 is a schematic diagram illustrating another example of simplification in the first embodiment of the present invention.

In addition, when the pixel-value interpolation is effected, there is no need for Formula (8) to hold, the image subject to subsampling processing may not have its high-frequency region restricted with the exception of the problem of aliasing distortion. Accordingly, in the encoding apparatus shown in FIG. 1, for example, the input image data 110 may be sent directly to the pixel subsampling unit 70 instead of providing the high-frequency coefficient masking unit 50 and the inverse DQT unit 60. In this case, processing can be simplified substantially. This schematic diagram is shown in FIG. 14. The description of various parts and the operation will be omitted. Incidentally, in a case where no quantization is effected with respect to the high-frequency components by the coefficient analyzing unit 30 shown in FIG. 1, the input image already satisfies Formula (8). Therefore, the encoding apparatus can still be realized by the configuration shown in FIG. 14 without affecting the image quality and the amount of codes.

Figure 1A:
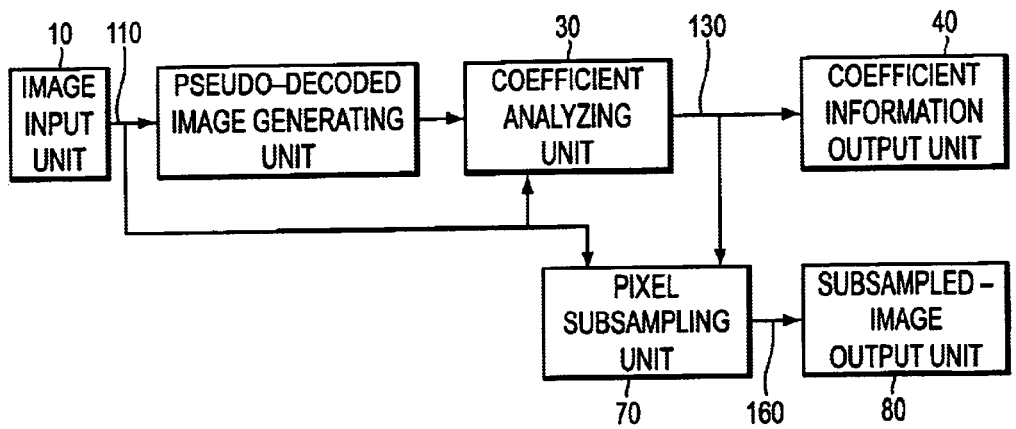
FIG. 1A is a schematic diagram illustrating an image encoding apparatus in accordance with a first simplification.

Further, also in a case where the pixel-value interpolation is effected by the decoding apparatus, a decoded image can be simulated by the encoding apparatus. Accordingly, instead of the coefficient analyzing unit 30 shown in FIG. 1, it is possible to provide a means which simulates the decoded image data 320 with pixel values interpolated, and determines the coefficient information data 130 while evaluating errors with the input image data 110. This is shown in FIG. 1A. The evaluation of errors may be effected on the basis of the signal-to-noise (SN) ratio, a maximum value of errors, the variance, the dynamic range, or the like. In this case, the coefficient information data 130 simply means the pixel sampling ratio. Since the frequency analysis is not effected in this case, the DCT unit 20 can be clearly omitted. Since the configuration can be analogized, a schematic diagram and the rest of the description will be omitted.

(Second Simplification)

Next, a case is considered in which, instead of the image, the DCT coefficients are received as an input. For example, in a case where an image encoded by the JPEG-DCT method is received, data which are obtained by corresponding entropy decoding are not pixel values but DCT coefficients. In such a case, it suffices if the DCT coefficients are inputted directly to the coefficient analyzing unit 30 and the high-frequency coefficient masking unit 50 of the encoding apparatus shown in FIG. 1. In this way, the DCT unit 20 and its processing can be omitted. This is a second example of simplification.

Figure 15:
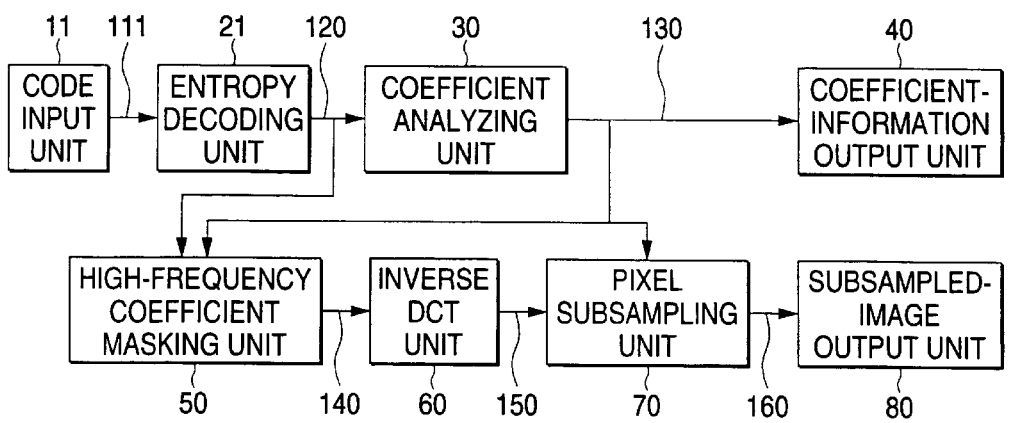
FIG. 15 is a schematic diagram illustrating still another example of simplification in the first embodiment of the present invention.

FIG. 15 is a schematic diagram of the second example of simplification of this embodiment. In the drawing, those portions which are similar to those of FIG. 1 are denoted by the same reference numerals, and a description thereof will be omitted. Reference numeral 11 denotes a code input unit; numeral 21 denotes an entropy decoding unit; and numeral 111 denotes encoded data.

A description will be given of the respective units shown in FIG. 15. The code input unit 11 receives a code from an external circuit as an input, and sends the same to the entropy decoding unit 21 as the encoded data 111. The entropy decoding unit 21 decodes the encoded data 111, and sends the same to the coefficient analyzing unit 30 and the high-frequency coefficient masking unit 50 as the coefficient data 120. Since the description of other portions and of the operation is largely similar to the above-described description, a description thereof will be omitted.

In the case where the DCT coefficients are thus inputted, a case can also be assumed in which the DCT coefficients have already been quantized. In this case, it is necessary to effect inverse quantization processing by the entropy decoding unit 21.

Further, if the quantization step for the inputted code is coarser than the quantization step set in advance for the coefficient analyzing unit 30, the processing of various units can be simplified. One processing which can be simplified concerns the coefficient analysis processing in the coefficient analyzing unit 30, and since the coefficients which are not 0s do not become 0s as a result of threshold processing, it suffices if, instead of performing threshold processing, a determination is merely made as to whether the frequency components are 0s or other than 0s. In addition, for a similar reason, the processing which is effected by the high-frequency coefficient masking unit 50 and the inverse DCT unit 60 can be omitted without the degradation of the image. The decoding apparatus shown in FIG. 15 may be provided with a configuration which makes it possible to bypass the aforementioned portions in such a case.

(Third Example of Simplification)

Next, a description will be given of a third example of simplification. According to the configurations shown in FIGS. 1 and 2, inputs and outputs are made independently with respect to the analyzed coefficient data 130 and the subsampled image data 160, but the two items of data may be combined and inputted or outputted. This is the third example of simplification.

Figure 16:
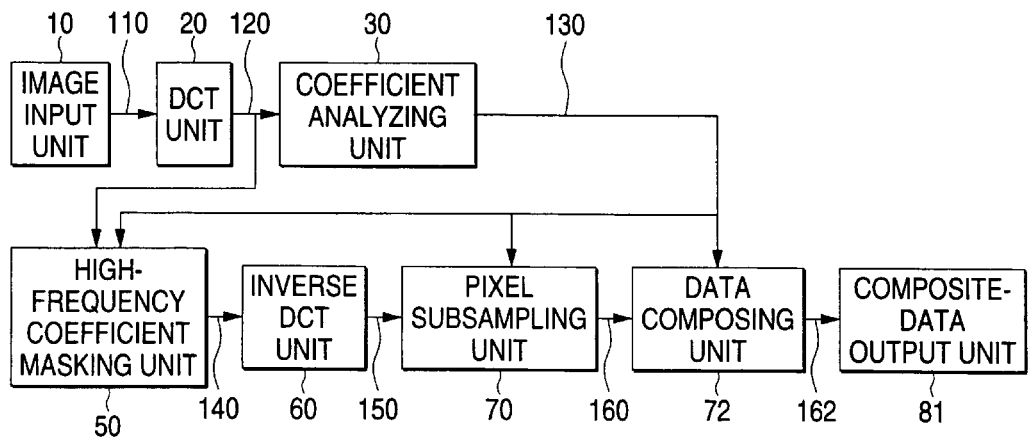
FIG. 16 is a schematic diagram illustrating a further example of simplification in the first embodiment of the present invention.

FIG. 16 is a schematic diagram of the third example of simplification of this embodiment. In the drawing, those portions which are similar to those of FIG. 1 are denoted by the same reference numerals, and a description thereof will be omitted. Reference numeral 72 denotes a data composing unit; 81, a composite-data output unit; and 162, composite data.

A description will be given of the various units shown in FIG. 16. The data composing unit 72 combines the analyzed coefficient data 130 and the subsampled image data 160, and sends the result to the composite-data output unit 81 as the composite data 162. The composite-data output unit 81 outputs the composite data 162 to an external circuit. Since the description of other portions and of the operation is largely similar to the above-described description, a description thereof will be omitted. In addition, since a decoding apparatus corresponding to the encoding apparatus in accordance with the third example of simplification can be easily analogized, a description thereof will be omitted.

Figure 17:
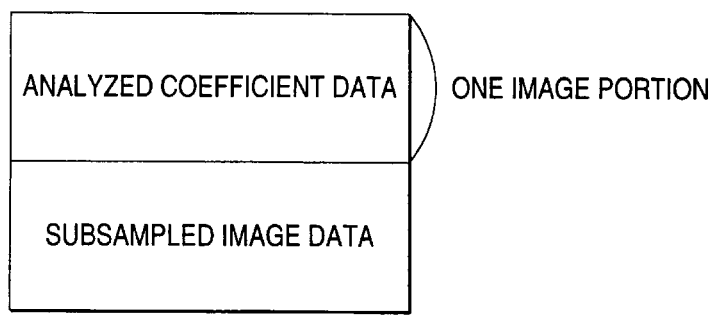
FIG. 17 is a diagram illustrating an example of simplification in the first embodiment of the present invention.
Figure 18:
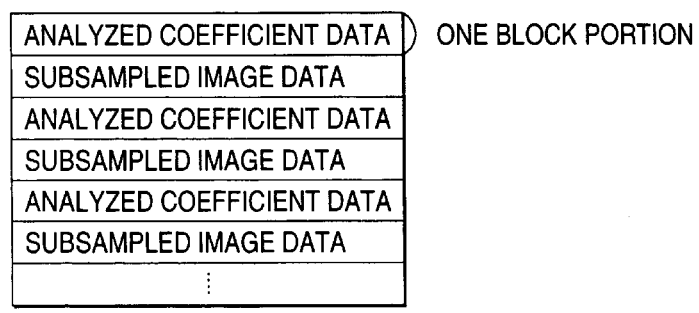
FIG. 18 is a diagram illustrating another example of simplification in the first embodiment of the present invention.

A description will be given of data composition processing which is effected by the data composing unit 72. The composite data 162 needs to be composed in such a manner that it can be decomposed into the analyzed coefficient data 130 and the subsampled image data 160 by the decoding apparatus. As such an example, a number of examples are conceivable, including a method in which the two items of data are simply combined as shown in FIG. 17 and a method in which the two items of data are combined in units of blocks as shown in FIG. 18. It goes without saying that the two items of data may be combined in other units.

(Fourth Simplification)

Next, a description will be given of a fourth example of simplification. In a case where effective frequency components of an input image are known in advance, the coefficient information may be designated from an external circuit. This is a fourth example of simplification.

Figure 19:
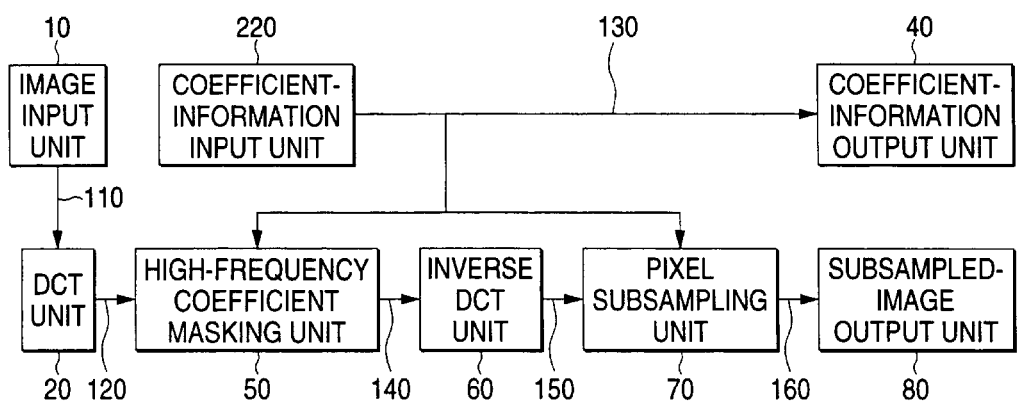
FIG. 19 is a schematic diagram illustrating a further example of simplification in the first embodiment of the present invention.

FIG. 19 is a schematic diagram of the fourth example of simplification of this embodiment. In the drawing, those portions which are similar to those of FIG. 1 are denoted by the same reference numerals, and a description of the various units and operation will be omitted.

If such a configuration is adopted, in a case where it is clearly known that high-frequency components are noise, those components which are directly set to 0s can be designated, so that the amount of codes decreases. As an example of such an image, it is possible to cite a natural image which has been enlarged after being inputted by, for instance, a low-resolution scanner. Such an enlarged image is sometimes subjected to processing such as edge enhancement so as to suppress the blurring due to enlargement. It cannot be said that high-frequency components which are generated by such processing are noise. However, since such high-frequency components can be reproduced after decoding, it is unnecessary to reproduce such high-frequency components with the maximum resolution referred to in the present invention. In the first conventional example, on the other hand, even in the case of such an image, reproduction is effected up to a high-frequency region, the amount of codes cannot be reduced. This phenomenon becomes noticeable as the resolution of an output device improves. This state is shown in FIG. 12.

Figure 20:
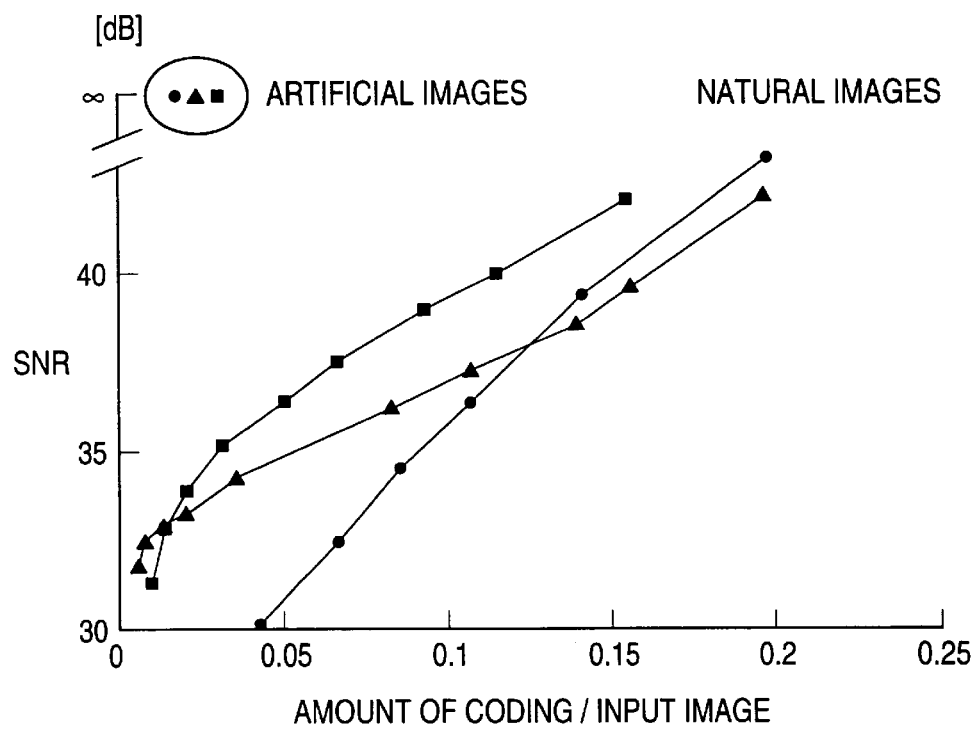
FIG. 20 is an explanatory diagram illustrating an example of the results of an experiment in accordance with the first embodiment of the present invention.

Finally, the results of an experiment in which natural images and artificial images were encoded in accordance with this embodiment are shown in FIG. 20. Further, decoded images of a natural image, which were prepared in accordance with this embodiment and the first conventional example, as well as differential images between an input image and the respective decoded images, are shown in FIGS. 24A to 24C and 25A, 25B, respectively.

(Second Embodiment)

The fundamental concept of the present invention lies in realizing lossy encoding processing in a pixel space by thinning out pixels which can be regarded as having been, so to speak, oversampled in a natural image. This concept can also be extended to a frequency transform technique other than DCT. Hereafter, a description will be given of an embodiment in which a general frequency transform technique is used as a second embodiment of the present invention.

Figure 21:
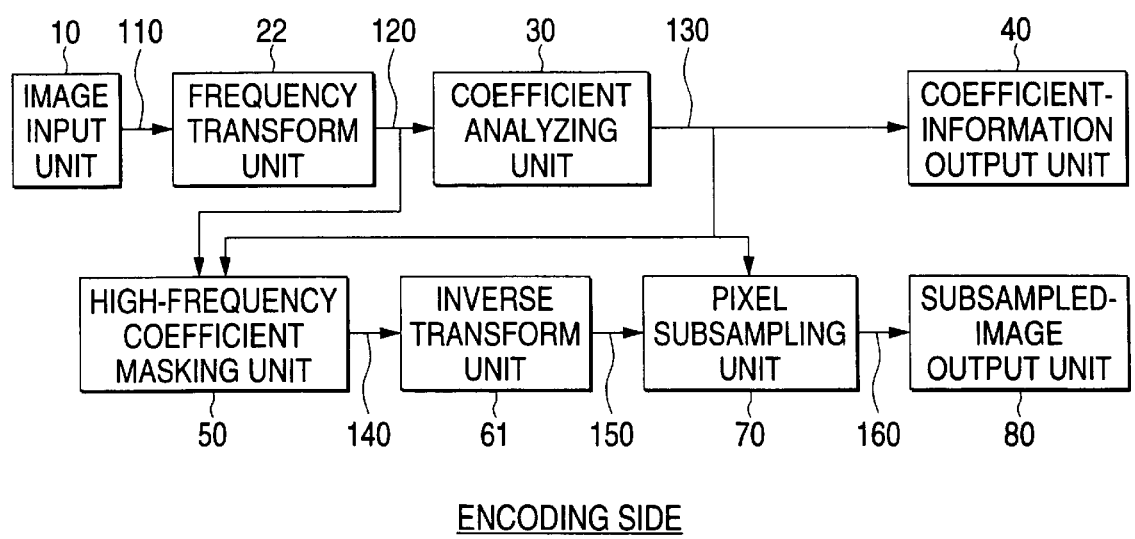
FIG. 21 is a schematic diagram illustrating an image encoding apparatus in accordance with a second embodiment of the present invention.
Figure 22:
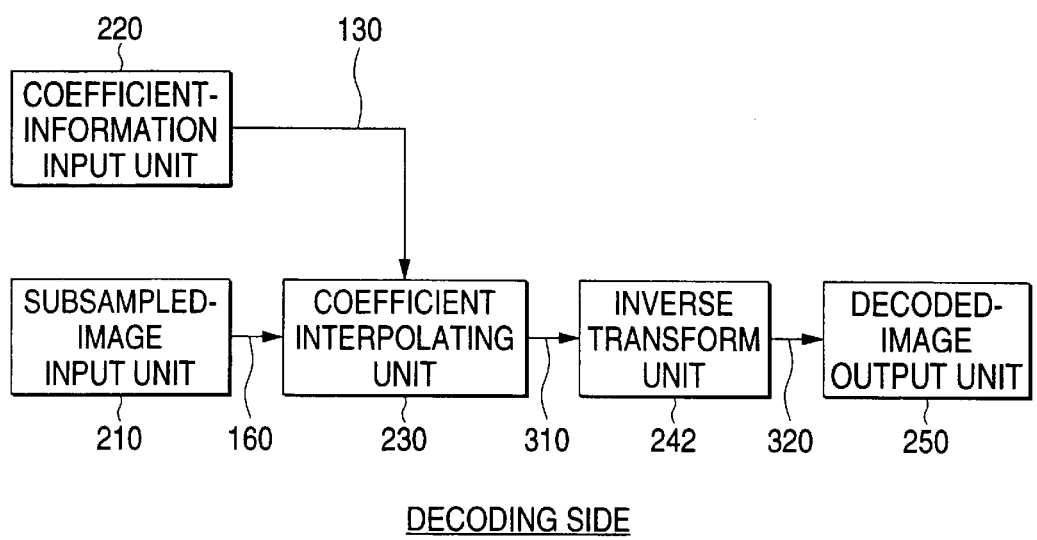
FIG. 22 is a schematic diagram illustrating an image decoding apparatus in accordance with the second embodiment of the present invention.
Figure 23:
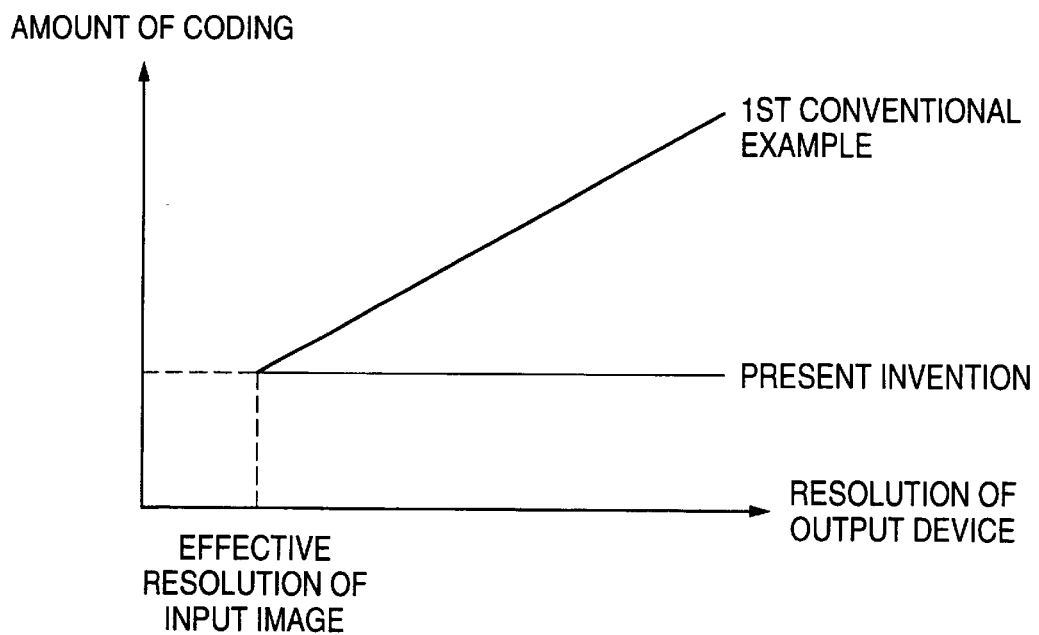
FIG. 23 is an explanatory diagram schematically illustrating the comparison of the amount of codes between the first embodiment and a first conventional example.
Figure 24A:
FIGS. 24A to 24C are explanatory diagrams illustrating the comparison of the degradation of image quality between the first embodiment and the first conventional example.
Figure 24B:
Figure 24C:
Figure 25A:
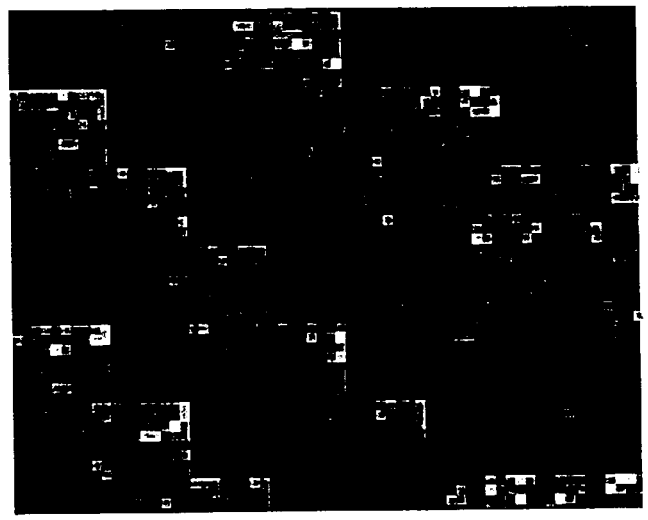
FIGS. 25A and 25B are explanatory diagrams illustrating the comparison of the degradation of image quality between the first embodiment and the first conventional example.
Figure 25B:
Figure 26:
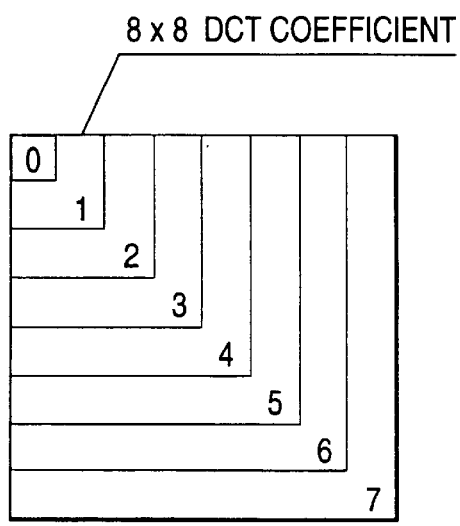
FIG. 26 is an explanatory diagram of an example of an experiment illustrating the characteristics of an image.

FIGS. 21 and 22 are, respectively, schematic diagrams of an image encoding apparatus and an image decoding apparatus in accordance with the second embodiment of the present invention. In the drawings, those portions which are similar to those of FIG. 1 are denoted by the same reference numerals, and a description thereof will be omitted. Reference numeral 22 denotes a frequency transform unit; 61, an inverse transform unit; and 242, an inverse transform unit.

A description will be given of the various units shown in FIGS. 21 and 22. The frequency transform unit 22 effects the frequency transform of the input image data 110 by some method, and sends the resultant frequency components to the coefficient analyzing unit 30 and the high-frequency coefficient masking unit 50 as the coefficient data 120. The inverse transform unit 61 and the inverse transform unit 242 effects inverse transform of the frequency transform effected by the frequency transform unit 22, with respect to the coefficient data 140 and 310, respectively, and output the results as the low-frequency image data 150 and the decoded image data 320, respectively. Since the description of other portions and of the operation is largely similar to the description of the first embodiment of the present invention, a description thereof will be omitted.

In the above-described description, the frequency transform processing may be any means insofar as it is capable of effecting frequency transform. For example, the fast Fourier transform, the discrete sine transform, the subband division, or the like may be employed.

The interpolation processing by the coefficient interpolating unit 230 is dependent upon the frequency transform processing which is employed. In the first embodiment, it has been described that interpolation can be realized by solving a simultaneous system of linear equations with respect to the DCT. A similar technique is applicable to a case where an image is divided into blocks by the fast Fourier transform and to the discrete sine transform.

In the case of subband division, for example, effectivity is determined for each band, and if the components of the bands which are regarded as ineffective are set to 0s, high-frequency coefficients can be masked. During interpolation, components of low-frequency bands are restructured from the subsampled image, and if the high-frequency bands are corrected by 0s, coefficient interpolation can be realized.

In addition, although it can be said about all frequency transform techniques, if the interpolation which is effected by the coefficient interpolating unit 230 is replaced by pixel-value interpolation as in the configuration of FIG. 13, interpolation processing can be realized, though in a simplified form.

As is apparent from the above description, in accordance with the present invention, efficient encoding and decoding processing can be realized by a single apparatus irrespective of the distinction between natural images and artificial images. Accordingly, as compared with the case where two encoding methods are combined, among other advantages, there is an advantage in that page memory can be eliminated. Further, high-speed image processing can be realized by effecting image processing in a later stage of the present invention. Furthermore, it is possible to realize encoding and decoding processing in which the image quality does not undergo degradation even by the repetition of encoding and decoding processing. Still further, generally, many actual high-resolution input images are enlarged ones of low-resolution images. In such a case, encoding can be effected with an amount of coding similar to that for an effective resolution persisting prior to enlargement.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image encoding apparatus comprising:
   image input means for inputting an image;
   pseudo-decoded image generating means for generating a pseudo-decoded image by subjecting the image inputted by said image input means to a predetermined subsampling processing and a predetermined interpolation processing;
   coefficient analyzing means for determining a subsampling rate on the basis of an error between the pseudo-decoded image generated by said pseudo-decoded-image generating means and the image inputted by said image input means;
   pixel subsampling means for subsampling the image inputted by said image input means, in correspondence with the subsampling rate determined by said coefficient analyzing means; and
   subsampled-image output means for outputting the subsampled image from said pixel subsampling means.

2. An image encoding apparatus according to claim 1, wherein the error used in said coefficient analyzing means is one of a dynamic range, a variance and a signal/noise ration or a maximum value of a pixel value error, an absolute value of the error, and a square value of the error.

3. An image encoding apparatus according to claim 1, wherein the predetermined interpolation processing by said pseudo-decoded-image generating means is one of a nearest-neighbor interpolation, a 4-point linear interpolation, a 9-point second-order interpolation, and a low-pass filter processing.

* * * * *